(12) United States Patent
Weiss et al.

(10) Patent No.: US 11,834,203 B2
(45) Date of Patent: Dec. 5, 2023

(54) DRIFT-BASED RENDEZVOUS CONTROL

(71) Applicant: Mitsubishi Electric Research Laboratories, Inc., Cambridge, MA (US)

(72) Inventors: Avishai Weiss, Boston, MA (US); Daniel Aguilar Marsillach, Boulder, CO (US); Stefano Di Cairano, Newton, MA (US)

(73) Assignee: MITSUBISHI ELECTRIC RESEARCH LABORATORIES INC., Cambridge, MA (US)

( * ) Notice: Subject to any disclaimer, the term of this patent is extended or adjusted under 35 U.S.C. 154(b) by 158 days.

(21) Appl. No.: 17/011,360

(22) Filed: Sep. 3, 2020

(65) Prior Publication Data
US 2022/0063842 A1  Mar. 3, 2022

(51) Int. Cl.
*B64G 1/10* (2006.01)
*B64G 1/00* (2006.01)
(Continued)

(52) U.S. Cl.
CPC ............. *B64G 1/242* (2013.01); *B64G 1/368* (2013.01); *B64G 2001/247* (2013.01)

(58) Field of Classification Search
None
See application file for complete search history.

(56) References Cited

U.S. PATENT DOCUMENTS 6,845,950 B1 *  1/2005  Goodzeit ............... B64G 1/007
701/13

2001/0025212 A1 *  9/2001  Belbruno ............... B64G 1/244
701/13
(Continued)

FOREIGN PATENT DOCUMENTS

| CN | 103455707 | 7/2013 |
| CN | 106707751 | 12/2016 |

(Continued)

OTHER PUBLICATIONS

Weiss, Model Predictive Control for Spacecraft Rendezvous and Docking: Strategies for Handling Constraints and Case Studies, 2015, pp. 1638-1647 (Year: 2015).*

(Continued)

*Primary Examiner* — Adam D Tissot
*Assistant Examiner* — Michael T Silva
(74) *Attorney, Agent, or Firm* — Gennadiy Vinokur; Hironori Tsukamoto; LABORATORIES

(57) ABSTRACT

Drift-based rendezvous control system for controlling an operation of a spacecraft to rendezvous the spacecraft to a goal region over a finite time (FT) horizon. The system including accepting data including values of spacecraft states at a specified time period within the FT horizon. A processor at the specified time period selects a set of drift regions corresponding to a desired goal region at a location on an orbit where the target is located at the specified time period. Update a controller having a model of dynamics of the spacecraft with the accepted data. Formulate the set of drift regions as a penalty in a cost function of the updated controller. Generate control commands resulting in a real-time drift-based control policy where upon entering the drift region, the thrusters are turned off in order to minimize an amount of operation of the thrusters while rendezvousing with the desired goal region.

21 Claims, 17 Drawing Sheets

(51) Int. Cl.
   *B64G 1/26* (2006.01)
   *G05D 1/02* (2020.01)
   *G05D 1/10* (2006.01)
   *B64G 1/24* (2006.01)
   *B64G 1/36* (2006.01)

(56) References Cited

U.S. PATENT DOCUMENTS

| | | | |
|---|---|---|---|
| 2002/0020785 A1* | 2/2002 | Eyerly | B64G 1/26 244/164 |
| 2004/0024528 A1* | 2/2004 | Patera | G08G 5/045 340/961 |
| 2009/0132105 A1* | 5/2009 | Paluszek | B64G 1/26 701/13 |
| 2010/0108819 A1* | 5/2010 | Kawaguchi | B64G 1/242 244/158.5 |
| 2010/0228409 A1* | 9/2010 | Acikmese | G05D 1/0676 701/16 |
| 2016/0194095 A1* | 7/2016 | Weiss | B64G 1/286 701/13 |
| 2018/0118377 A1* | 5/2018 | Garber | B64G 1/242 |
| 2018/0148197 A1* | 5/2018 | Halsband | B64G 1/242 |
| 2019/0049998 A1 | 2/2019 | Weiss et al. | |
| 2021/0292011 A1* | 9/2021 | Limotta | G06N 3/04 |

FOREIGN PATENT DOCUMENTS

| | | | | |
|---|---|---|---|---|
| CN | 106707751 B | * | 5/2019 | |
| CN | 110727199 | | 11/2019 | |
| CN | 110806212 A | * | 2/2020 | G01C 21/02 |

OTHER PUBLICATIONS

Translation of CN110806212A from Espacenet (Year: 2020).*

* cited by examiner $i$ = Inclination
$\omega$ = Argument of Periapsis
$\Omega$ = Longitude of Ascending Node
$N_1$ = Ascending Node
$N_2$ = Descending Node

DRIFT-BASED RENDEZVOUS CONTROL

FIELD

The present disclosure relates generally to controlling an operation of a chaser spacecraft, and more particularly to a drift-based rendezvous control system to rendezvous the chaser spacecraft to a goal region over a finite time horizon.

BACKGROUND

Safe rendezvous for a chaser spacecraft to a target is an ability to avoid a collision between the chaser spacecraft and its target in the event of full or partial loss of thruster control. Conventional chaser spacecraft approaches include a trajectory generation process, completed in open-loop, wherein the rendezvous has open-loop trajectory design and then employs a suboptimal closed-loop trajectory tracking scheme. This partial open loop method requires simulations done on earth, and is not fully autonomous or able to re-optimize the trajectory based on unmodeled forces acting upon the spacecraft while attempting to complete the rendezvous.

For example, space redezvous is a set of orbital maneuvers performed during which two spacecraft, i.e. chaser spacecraft and a target or space station, arrive at the same orbit and approach to a very close distance (e.g. within visual contact). Rendezvous requires a precise match of the orbital velocities and position vectors of the two spacecraft, allowing them to remain at a constant distance through orbital station-keeping. Rendezvous may or may not be followed by docking or berthing, procedures which bring the spacecraft into physical contact and create a link between them. Further, the same rendezvous technique can be used for spacecraft "landing" on natural objects if there is a weak gravitational field, e.g. landing on an asteroid or on one of the Martian moons would require the same matching of orbital velocities, followed by a "descent" that shares some similarities with docking.

However, safe rendezvous to targets presents several challenges for chaser spacecraft. A critical criteria for rendezvous is the maintenance of passive safety, that is, an ability to avoid a collision between a chaser spacecraft and its target, and achieving safe rendezvous for the chaser spacecraft is difficult, as learned from the Demonstration of Autonomous Rendezvous Technology (DART) mission launched Apr. 15, 2005. The DART mission was set out on a 24-hour mission to meet and fly around an aging military communications satellite dubbed Mublcom. The mission ended less than 11 hours later after DART collided with Mublcom, instead of performing a series of precise maneuvers around the small spacecraft. After a 4.5-month, $1 million investigation into the mishap, Scott Croomes, the NASA engineer who chaired the DART Mishap Investigation Board, said the mission's failure stemmed from a combination of spacecraft navigation errors traced back to missteps by the vehicle's Orbital Sciences Corp., led design team. Croomes also said the DART's GPS receiver misstated DART's velocity, and the software designers had not adequately accounted for any such receiver bias. Where, in the designing of the software model, the team used to simulate the receiver during testing which assumed the receiver measured velocity perfectly. Nevertheless, the NASA spokeswoman Kim Newton, at the time, said the agency's investment in autonomous rendezvous and docking technology needed to continue, and be more advanced.

Further, the National Research Council recognizes that autonomous relative guidance, navigation, and control algorithms are some of the highest-priority technologies for future spacecraft missions. Such techniques play a fundamental role in acquiring valuable scientific data and in the exploration of the solar system. For increasingly complex and autonomous missions, there is a need to develop more robust, reliable, and, importantly, fail-safe relative guidance, navigation, and control algorithms.

Therefore, a need exists in the art for an improved way to control an operation of a chaser spacecraft, for safe rendezvous that includes methods for approaches that prevent the chaser spacecraft from colliding with the target in the event of full or partial loss of thruster control, while at the same time maximizing the chaser spacecraft's fuel efficiency or thruster performance metrics during the rendezvous, among other aspects.

SUMMARY

The present disclosure relates generally to controlling an operation of a chaser spacecraft, and more particularly to a drift-based rendezvous control system to rendezvous the chaser spacecraft to a goal region over a finite time horizon.

Spacecraft rendezvous is a process where a chaser spacecraft, which is thruster controlled, aims to approach and remain near a target location, which is often uncontrolled. There exists an infinite number of maneuvers to essentially get the chaser spacecraft from a starting point to a desired target state. Specifying mission objectives reduces an amount of viable maneuvers to be considered. Examples include minimizing an amount of propellant usage throughout a maneuver, quantified by a total delta-V, or minimizing an amount of time a set of thrusters on-board a spacecraft are to be used i.e. turned on. The latter is important to avoid thruster anomalies, thereby reducing maneuver risk, as well as preventing damage to sensitive instrumentation on-board a controlled chaser spacecraft.

Embodiments of the present disclosure address and overcome spacecraft rendezvous with a target location by providing a solution to the conventional problems of wanting to consume less fuel, i.e. propellant, while decreasing thruster's on time, while rendezvousing with the target location. Fuel is among the many critical resources for spacecraft, and saving fuel leads to increasing mission lifetime, and decreasing launch costs.

Some embodiments of the present disclosure include a drift-based rendezvous control system for controlling an operation of a spacecraft to rendezvous the spacecraft to a goal region over a finite time horizon. These embodiments can assist an operator of the chaser spacecraft desire to rendezvous with a target while using the least amount of thruster operation as possible from a starting location to a target location. In order to achieve such a goal some aspects include utilizing natural orbital motions along with exploiting perturbations acting on the chaser spacecraft such as non-keplerian perturbations including solar and lunar gravitational perturbations, anisotropic gravitational perturbations due to a central body's non-sphericity, solar radiation pressure, and air drag, to place the chaser spacecraft in motion to the target.

For example, to use a least amount of thruster operation as possible, this embodiment provides some implementation steps. Such as, accepting data via a transceiver, where the data includes values of spacecraft states at a specified time period within the finite time horizon. Wherein a processor at the specified time period can access a memory having a goal region database and other data, and selects a set of drift regions corresponding to a desired goal region at a location on an orbit where the target is located at the specified time period. The selected set of drift regions represents regions of space around the desired goal region that guarantee spacecraft thruster free operation to reach the desired goal region. The processor updates a controller having a model of dynamics of the chaser spacecraft with the accepted data, i.e. updating using the values of spacecraft states at the specified time period within the finite time horizon. Then, the processor can formulate the set of drift regions as a penalty in a cost function of the updated controller. Generate control commands that result in a real-time drift-based control policy, where upon entering the drift region the thrusters can be turned off, in order to minimize an amount of operation of the spacecraft thrusters while rendezvousing with the desired goal region. Wherein, the processor can output the control commands to activate or not activate one or more thrusters of the chaser spacecraft for the specified time period based on the control commands.

Other embodiments of the present disclosure include a drift-based control policy for chaser spacecraft, i.e. spacecraft, rendezvous on elliptic orbits using backwards reachable sets and model predictive control (MPC) to approach and remain near a target in an event of full or partial thruster control failure. Wherein these embodiments incorporate safe spacecraft rendezvous with a target location on generic elliptical and near rectilinear halo orbits by incorporating backwards reachable sets (BRSs) computed to obtain sets of states which naturally drift (without use of spacecraft thruster control) into a final set of BRSs of interest designated as desired goal region. The natural drift in space results when all thrusters of the spacecraft are off, such that forces acting on a multi-object celestial system create natural orbital motion, i.e. natural drift that places the spacecraft in motion. The natural orbital forces and perturbations can include earth gravity, solar and lunar gravitational perturbations, anisotropic gravitational perturbations due to a central body's non-sphericity, solar radiation pressure, and air drag. For example, in a safe spacecraft rendezvous scenario, avoidance sets (i.e. avoidance regions) are computed using BRS emanating from a target region specified around the target location. By enforcing the spacecraft to be outside of these avoidance sets the spacecraft ensures passive safety or abort-safety, such that in an event of total or partial loss of control or thrust control, the spacecraft would not drift and enter in the avoidance region, thereby ultimately avoiding entering the target region and avoiding collision.

In particular, the goal region is defined near the target region. Computing the backwards reachable sets (BRSs) of the goal region results in a set of drift regions that represent the sets of states for the spacecraft that would naturally drift into the desired goal region in a certain number of steps without the use of thrusters. Computing the backwards reachable sets (BRSs) of the target region results in the set of avoidance regions that represent the sets of states that if the spacecraft were to lose full or partial thruster control, the spacecraft would drift and intersect with the target region. Since the set of avoidance regions and set of drift regions are nearby, due to the dynamics of the problem, the BRSs of these two sets intersect in certain parts of higher-dimensional state space, which makes avoiding one avoidance region while entering the drift region challenging.

To get a visualization of the above scenario, imagine a person with a paddle in a canoe traveling down a river having multiple water currents, where there is a large rock on one side of the river and the other side is rock-free for the canoe to travel safely. Such that two sets of backwards reachable sets (BRSs) are determined including a set of avoidance regions and a set of rock-free drift regions. The set of avoidance regions represent regions of space around the large rock region in the river guaranteeing intersection trajectories with the large rock region, in an event the person could not paddle at all or at least partially paddle. Thus, the set of avoidance regions in the river are regions the canoe should not enter.

Whereas, the set of rock-free drift regions represent regions of space around the rock-free region that guarantee trajectories to the rock-free region in the river, where the canoe can drift, in an event that the person could not paddle or at least partially paddle (or does not wish to paddle in order to conserve energy). Thus, the set of rock-free drift regions in the river are regions the canoe should enter. However, the rock-free drift regions and the avoidance regions may partially overlap. That is, there may be some part of the water currents that first intersect with the large rock before reaching the rock-free region. The goals of the canoe are to enter the set of rock-free drift regions in the river, while also avoiding the specific water currents, that if the person could not paddle or only partially paddle, would result in the canoe drifting and colliding with the large rock.

In terms of implementation of the systems and methods of the present disclosure, a model predictive control (MPC) is utilized to provide for an online safe trajectory generation which drives the spacecraft towards the set of drift regions while avoiding the avoidance regions (and any overlap between the drift and avoidance regions). Wherein the model drives or directs the spacecraft to enter the set of drift regions by applying a penalty to an original MPC cost function, if the spacecraft is outside of the set of drift regions, and uses state constraints to stay outside the avoidance regions. This prioritizes the MPC policy to minimize the violation of these constraints, ultimately leading the spacecraft into a nearby desired goal region, which is proximate to the target. Upon entering the subset of drift regions that are also simultaneously outside the avoidance regions, due to the dynamics of the problem, the spacecraft is able to move towards the desired goal region naturally, without thruster control, in a safe manner that does not intersect with the target region. As such, a goal is for the spacecraft at some future time step to enter the desired goal region, while being outside of the set of avoidance regions. This ensures that the spacecraft can coast (drift via natural forces in space) and move towards the desired goal region while disengaging all thrusters.

Some concepts and challenges addressed during experimentation included contemplating how to solve an issue, in the absence of safety constraints. For example, one aspect was to solve for an optimal delta-v maneuver, i.e. minimum fuel maneuver, by solving a standard optimal control problem, a two-point boundary value problem, or by making use of primer-vector theory. When convex or non-convex state or input constraints were present, a multitude of techniques were reviewed that could be employed to optimize a trajectory in an online setup. Some examples include model-predictive-control (MPC), local and global collocation, shooting methods, and successive convexification.

Other concepts considered during experimentation included passive and abort-safe spacecraft rendezvous in the event of full or partial loss of thruster control, which required avoiding unsafe regions of state space, which can be characterized using reachability theory. For LTV systems, this could require satisfying a large number of non-convex constraints. Solving the full delta-v optimal control that is passive or abort-safe requires solving a nonlinear program with a multitude of non-convex constraints, presenting a challenge for real-time implementation. This could motivate an approach that yields passive or abort-safe trajectories that can be used in an online manner while reducing thruster on-off switches and the total delta-V consumed.

Backwards Reachable Set

Stored in a memory can be a target region database and a goal region database, where a goal region is outside of a target region. To select a set of avoidance regions that need to correspond to a desired target region at a location on an orbit where the target is located at the specified time period. The set of avoidance regions represents regions of space around the desired target region guaranteeing intersection trajectories with the desired target region, in an event of total or partial spacecraft thruster failure. Wherein the selecting of a set of drift regions need to correspond to a desired goal region in proximity to a location on an orbit where the target is located at the specified time period. The set of drift regions represents regions of space around the desired goal region that guarantee spacecraft thruster free operation to reach the desired goal region. The set of drift regions can be incorporated or formulated as a penalty to an original MPC cost function in the MPC online safe trajectory generation, which uses state constraints to stay outside the avoidance regions, in order to guide the spacecraft to rendezvous with the target through an inherently safe approach in an event of total or partial spacecraft thruster failure, while also allowing the spacecraft operation to turn off the thrusters and save fuel once the spacecraft enters the drift regions.

Some System and Method Implementation Steps

Upon determining the set of avoidance regions representing regions of space around the desired target region, and the set of drift regions representing regions of space around the desired goal region. The set of avoidance regions are formulated as constraints.

A controller having a model of dynamics of the spacecraft is updated with data obtained from an input interface, a transceiver or like device. The data can include real-time values of spacecraft states and the target states in a multi-object celestial system at a specified time period within the finite time horizon. Then, the set of drift regions can be formulated as a penalty in a cost function of the updated controller. Wherein control commands can be generated using the updated controller by subjecting the updated controller to the avoidance constraints to generate control commands that result in a real-time drift-based control policy that produces a collision free rendezvous trajectory which avoids the set of avoidance regions. The control commands guarantee an intersection-free trajectory with respect to the desired target region in the event of the total or partial spacecraft thruster failure. Upon the spacecraft entering the set of drift regions, the thrusters can be turned off in order to minimize an amount of operation of the thrusters while rendezvousing with the target. The control commands can be outputted to activate or not activate one or more thrusters of the spacecraft for the specified time period based on the control commands.

In other words, some embodiments of the present disclosure can include a controller configured for controlling an operation of the chaser spacecraft to rendezvous the spacecraft with a target over a finite time horizon. The target can be one of a spacecraft, a celestial body or orbital debris. The finite time horizon of the spacecraft begins at a starting position and continues with multiple specified time periods, and ends when the spacecraft arrives at the target location. Current data is accepted from sensors, the data can include values of spacecraft states and target states in a multi-object celestial system at a specified time period within the finite time horizon. The spacecraft states and the target states in the multi-object celestial system can include one or combination of positions, orientations, and translational and angular velocities of the chaser spacecraft and the target, and perturbations acting on the multi-object celestial system. Notes, is that the spacecraft and the target form the multi-object celestial system. Perturbations acting on the multi-object celestial system can be natural orbital forces such as solar and lunar gravitational perturbations, anisotropic gravitational perturbations due to a central body's non-sphericity, solar radiation pressure, and air drag.

A processor can be utilized at the specified time period, to identify a location in an orbit on which the target is located from the accepted data. For example, the target orbit location can be determined from the accepted data based on uploaded ephemeris from a ground station, based on ground data obtained in satellite tracking databases, or estimated from onboard sensor measurements on the vehicle obtained from the accepted data.

The processor can then convert or formulate the set of avoidance regions into safety constraints, e.g. passive safety or abort safety constraints, and send the safety constraints to the controller. Depending on a user specific controller design configuration(s), the controller can include a control module, wherein the controller or control module can be configured to process such converting or formulating steps. The controller can include a model of dynamics of the vehicle, such that the controller is updated with the accepted data. Upon updating, the updated controller is subject to the safety constraints to generate control commands that produce a collision free rendezvous trajectory which avoids unsafe or avoidance regions for the specified time period, guaranteeing a collision free trajectory with respect to the target in the event of the total or partial vehicle thruster failure, so the spacecraft does not collide with the target. Wherein the control commands can be outputted to activate or not activate one or more thrusters of the vehicle for the specified time period based on the control commands.

For example, the control commands may be outputted to an operations module of the controller, such that the operations module can communicate the control commands to a thruster command module that receives the control commands as delta v commands. The thruster command module can then convert the delta v commands to thruster commands, and send the thruster commands to a thruster processor of at least one thruster, to activate or not activate the at least one thruster for trajectory-tracking control of the vehicle, according to the converted delta v commands.

Another embodiment of the present disclosure can use a trajectory generation function of the controller that uses the current data or accepted data, to identify the target orbit location at the specified time-period of multiple specified time-periods within the finite time horizon.

However, in order to develop some of the embodiments of the present disclosure there were assumptions and realizations that assisted in their development. Some assumptions made in terms of a spacecraft model, included the target and the spacecraft were configured to be in orbit around a central body, i.e. Earth. Further assumed is that both the target and spacecraft's bodies were to be rigid and all external forces acting on the spacecraft are assumed to act on a center of mass of their respective bodies. For the purposes of rendezvous, some calculations had to be resolved relative to positions and velocities of the spacecraft in the target's orbital frame, which is later explained in detail.

According to an embodiment of the present disclosure, a drift-based rendezvous control system for controlling an operation of a chaser spacecraft to rendezvous the chaser spacecraft to a goal region over a finite time horizon. The drift-based rendezvous control system including a transceiver accepts data including values of chaser spacecraft states at a specified time period within the finite time horizon. A processor at the specified time period is to access a memory having a stored data including a goal region database. Select a set of drift regions corresponding to a desired goal region at a location on an orbit where the target is located at the specified time period. Wherein the set of drift regions represents regions of space around the desired goal region that guarantee thruster free operation to reach the desired goal region. Update a controller having a model of dynamics of the chaser spacecraft with the accepted data. Formulate the set of drift regions as a penalty in a cost function of the updated controller. Generate control commands that result in a real-time drift-based control policy where upon entering the drift region, the thrusters are turned off in order to minimize an amount of operation of the thrusters while rendezvousing with the desired goal region. Output the control commands to activate or not activate one or more thrusters of the chaser spacecraft for the specified time period based on the control commands.

According to an embodiment of the present disclosure, a drift-based rendezvous control system for controlling an operation of a spacecraft to rendezvous the spacecraft with a target over a finite time horizon. The drift-based rendezvous control system including a transceiver accepts data including values of spacecraft states and the target states in a multi-object celestial system at a specified time period within the finite time horizon. A processor at the specified time period is to access a memory having stored a target region database and a goal region database, where a goal region is outside a target region. Select a set of avoidance regions corresponding to a desired target region at a location on an orbit where the target is located at the specified time period. Wherein the set of avoidance regions represents regions of space around the desired target region guaranteeing intersection trajectories with the desired target region, in an event of total or partial spacecraft thruster failure. Select a set of drift regions corresponding to a desired goal region in proximity to a location on an orbit where the target is located at the specified time period. Wherein the set of drift regions represents regions of space around the desired goal region that guarantee spacecraft thruster free operation to reach the desired goal region. Formulate the set of avoidance regions as constraints. Update a controller having a model of dynamics of the spacecraft with the accepted data. Formulate the set of drift regions as a penalty in a cost function of the updated controller. Generate control commands by subjecting the updated controller to the constraints to generate control commands that result in a real-time drift-based control policy producing a collision free rendezvous trajectory which avoids the set of avoidance regions, guaranteeing an intersection-free trajectory with respect to the desired target region in the event of the total or partial spacecraft thruster failure and upon the spacecraft entering the set of drift regions the thrusters are turned off in order to minimize an amount of operation of the thrusters while rendezvousing with the target. Output the control commands to activate or not activate one or more thrusters of the spacecraft for the specified time period based on the control commands.

According to an embodiment of the present disclosure, a drift-based rendezvous control method for controlling an operation of a spacecraft to rendezvous the spacecraft with a target over a finite time horizon. The drift-based rendezvous control method including accepting data including values of spacecraft states and the target states in a multi-object celestial system at a specified time period within the finite time horizon. Using a processor at the specified time period is for accessing a memory having stored a target region database and a goal region database, where a goal region is outside a target region. Selecting a set of avoidance regions corresponding to a desired target region at a location on an orbit where the target is located at the specified time period. Wherein the set of avoidance regions represents regions of space around the desired target region guaranteeing intersection trajectories with the desired target region, in an event of total or partial spacecraft thruster failure. Selecting a set of drift regions corresponding to a desired goal region in proximity to a location on an orbit where the target is located at the specified time period. Wherein the set of drift regions represents regions of space around the desired goal region that guarantee spacecraft thruster free operation to reach the desired goal region. Formulating the set of avoidance regions as constraints.

According to an embodiment of the present disclosure, a non-transitory machine-readable medium including instructions stored thereon which, when executed by processing circuitry, configure the processing circuitry in real time to control an operation of a spacecraft to rendezvous the spacecraft with a target over a finite time horizon using a drift-based rendezvous control method. A transceiver accepts data including values of spacecraft states and the target states in a multi-object celestial system at a specified time period within the finite time horizon. The method including using a processor at the specified time period is for accessing a memory having stored a target region database and a goal region database, where a goal region is outside a target region. Selecting a set of avoidance regions corresponding to a desired target region at a location on an orbit where the target is located at the specified time period. Selecting a set of drift regions corresponding to a desired goal region in proximity to a location on an orbit where the target is located at the specified time period. Formulating the set of avoidance regions as constraints. Updating a controller having a model of dynamics of the spacecraft with the accepted data. Formulating the set of drift regions as a penalty in a cost function of the updated controller. Generating control commands by subjecting the updated controller to the constraints to generate control commands that result in a real-time drift-based control policy producing a collision free rendezvous trajectory which avoids the set of avoidance regions, guaranteeing an intersection-free trajectory with respect to the desired target region in the event of the total or partial spacecraft thruster failure and upon the spacecraft entering the set of drift regions the thrusters are turned off in order to minimize an amount of operation of the thrusters while rendezvousing with the target. Outputting the control commands to activate or not activate one or more thrusters of the spacecraft for the specified time period based on the control commands.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
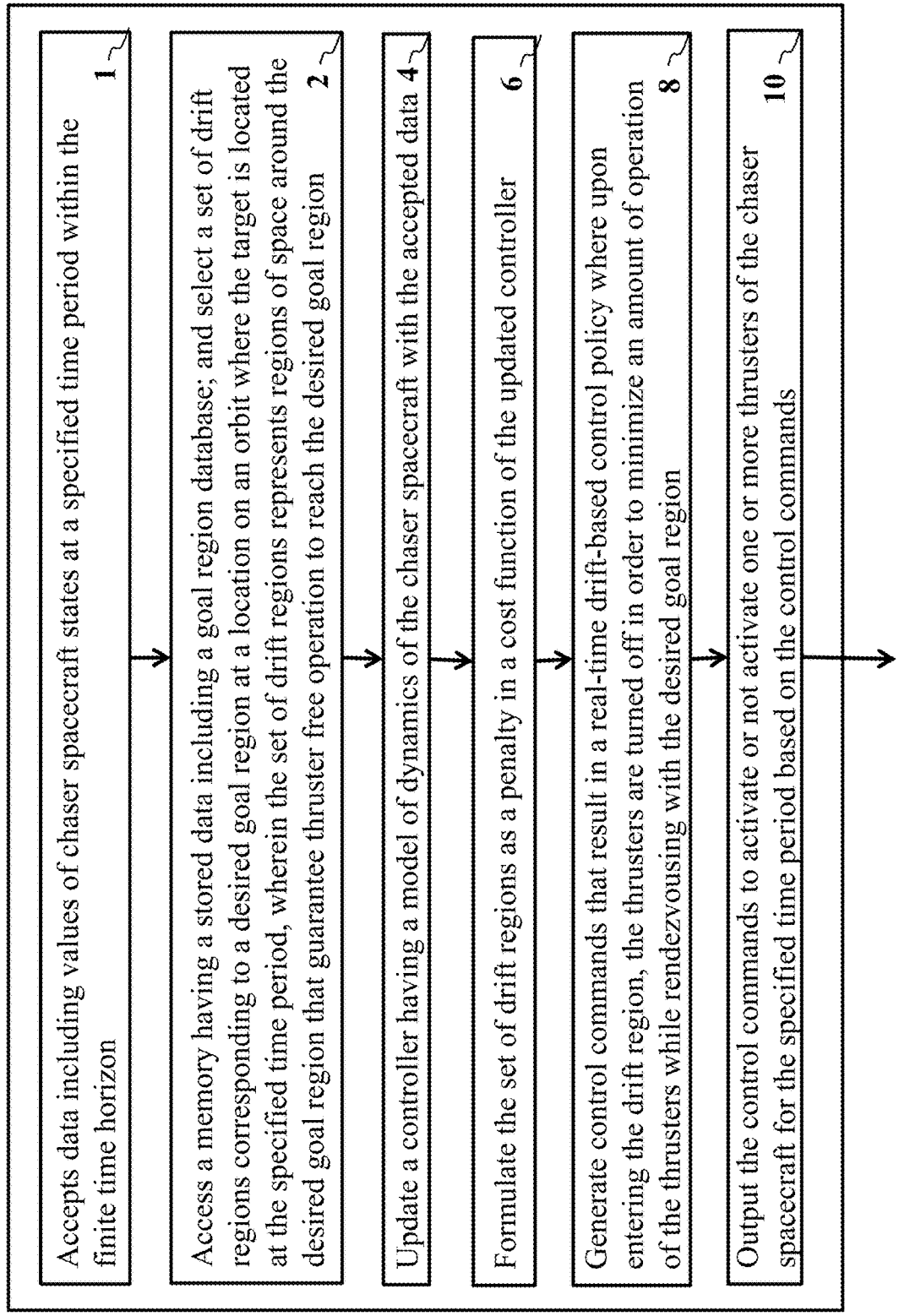
FIG. 1A is a block diagram illustrating of an embodiment of some drift-based rendezvous control system steps for controlling an operation of a chaser spacecraft to rendezvous the chaser spacecraft to a goal region over a finite time horizon, according to an embodiment of the present disclosure.

FIG. 1A is a block diagram illustrating of an embodiment of some drift-based rendezvous control system steps for controlling an operation of a chaser spacecraft to rendezvous the chaser spacecraft to a goal region over a finite time horizon, according to an embodiment of the present disclosure.

Step 1 of FIG. 1A includes accepts data including values of chaser spacecraft states at a specified time period within the finite time horizon.

Step 2 of FIG. 1A includes access a memory having a stored data including a goal region database; and select a set of drift regions corresponding to a desired goal region in a location of an orbit where the target is located at the specified time period, wherein the set of drift regions represents regions of space around the desired goal region that guarantee thruster free operation to reach the desired goal region.

Step 4 of FIG. 1A includes update a controller having a model of dynamics of the chaser spacecraft with the accepted data.

Step 6 of FIG. 1A includes formulate the set of drift regions as a penalty in a cost function of the updated controller.

Step 8 of FIG. 1A includes generate control commands that result in a real-time drift-based control policy where upon entering the drift region, the thrusters are turned off in order to minimize an amount of operation of the thrusters while rendezvousing with the desired goal region.

Step 10 of FIG. 1A includes output the control commands to activate or not activate one or more thrusters of the chaser spacecraft for the specified time period based on the control commands.

Figure 1B:
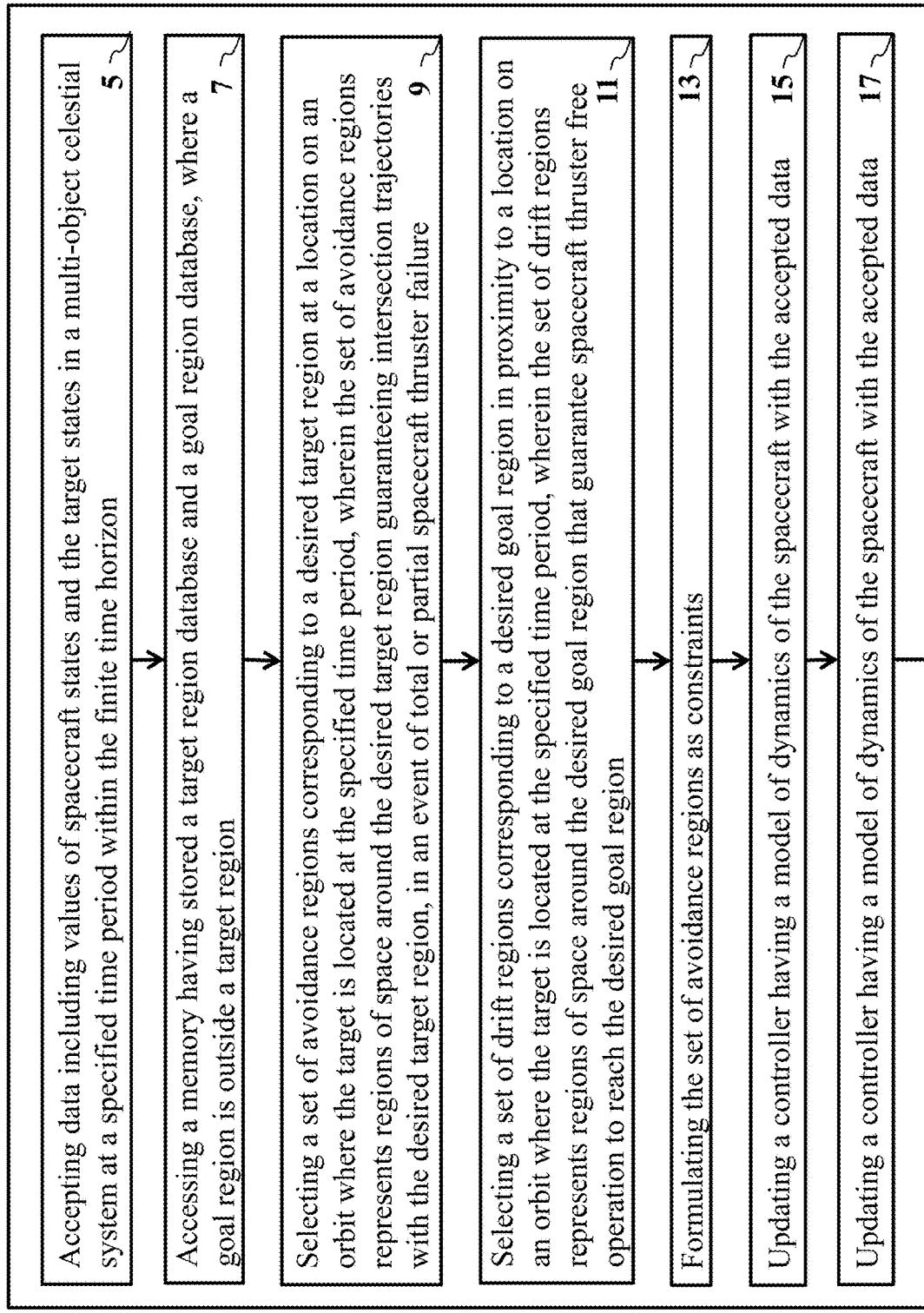
FIG. 1B and FIG. 1C are block diagrams illustrating of another embodiment of some drift-based rendezvous control system and method steps for controlling an operation of a spacecraft to rendezvous the spacecraft with a target over a finite time horizon, according to some embodiments of the present disclosure.
Figure 1C:
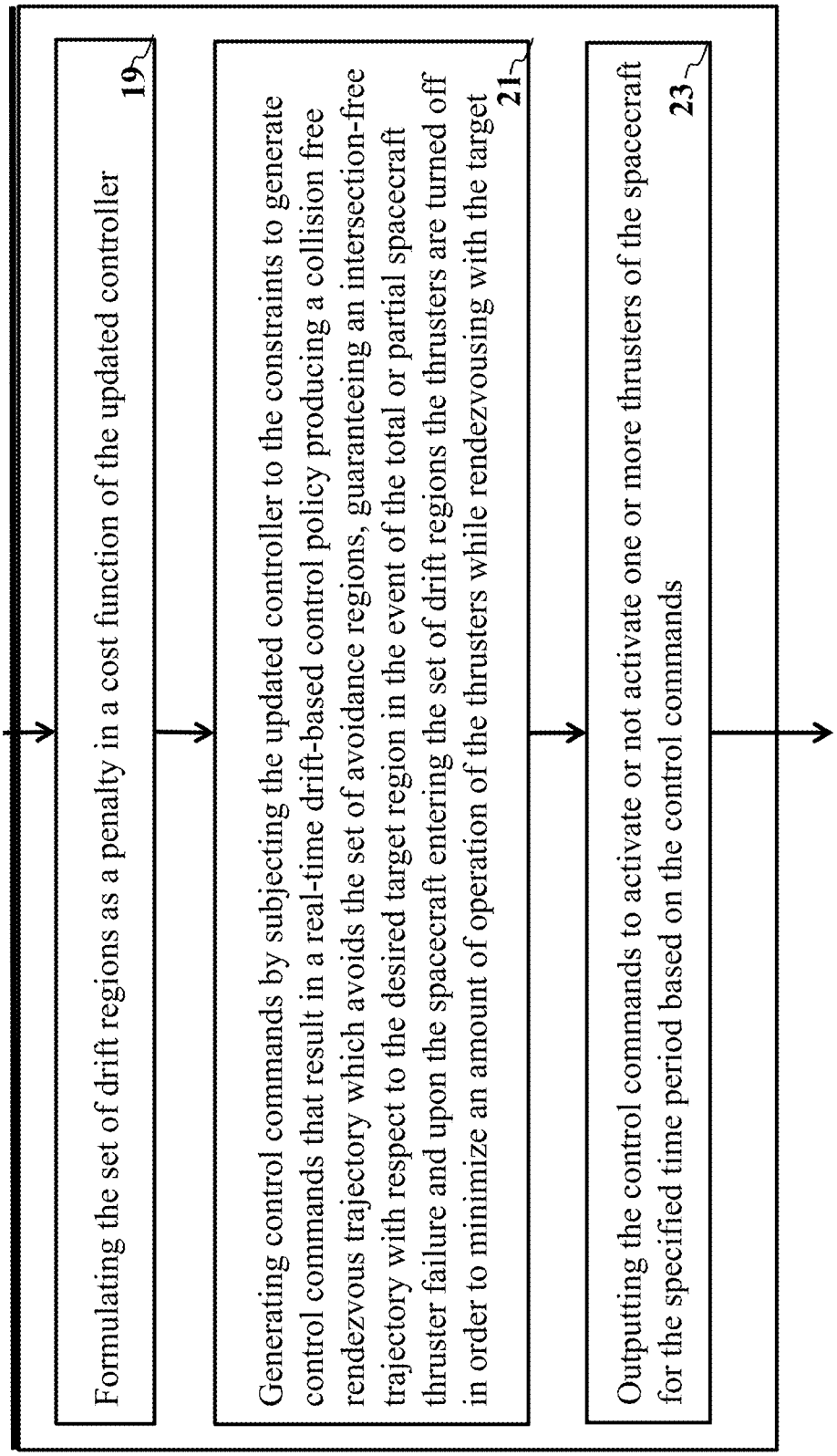

FIG. 1B and FIG. 1C are block diagrams illustrating of another embodiment of some drift-based rendezvous control system and method steps for controlling an operation of a spacecraft to rendezvous the spacecraft with a target over a finite time horizon, according to an embodiment of the present disclosure.

Step 5 of FIG. 1B includes accepting data including values of spacecraft states and the target states in a multi-object celestial system at a specified time period within the finite time horizon.

Step 7 of FIG. 1B includes a processor to access a memory having stored a target region database and a goal region database, where a goal region is outside a target region.

Step 9 of FIG. 1B includes selecting a set of avoidance regions corresponding to a desired target region in a location of an orbit where the target is located at the specified time period, wherein the set of avoidance regions represents regions of space around the desired target region guaranteeing intersection trajectories with the desired target region, in an event of total or partial spacecraft thruster failure.

Step 11 of FIG. 1B includes selecting a set of drift regions corresponding to a desired goal region in proximity to a location on an orbit where the target is located at the specified time period, wherein the set of drift regions represents regions of space around the desired goal region that guarantee spacecraft thruster free operation to reach the desired goal region.

Step 13 of FIG. 1B includes formulating the set of avoidance regions as constraints.

Step 15 of FIG. 1B includes updating a controller having a model of dynamics of the spacecraft with the accepted data.

Step 17 of FIG. 1B includes updating a controller having a model of dynamics of the spacecraft with the accepted data.

Step 19 of FIG. 1C includes formulating the set of drift regions as a penalty in a cost function of the updated controller.

Step 21 of FIG. 1C includes generating control commands by subjecting the updated controller to the constraints to generate control commands that result in a real-time drift-based control policy producing a collision free rendezvous trajectory which avoids the set of avoidance regions, guaranteeing an intersection-free trajectory with respect to the desired target region in the event of the total or partial spacecraft thruster failure and upon the spacecraft entering the set of drift regions the thrusters are turned off in order to minimize an amount of operation of the thrusters while rendezvousing with the target.

Step 23 of FIG. 1C includes outputting the control commands to activate or not activate one or more thrusters of the spacecraft for the specified time period based on the control commands.

Embodiments of the present disclosure provide important solutions to orbital rendezvous which is a critical phase for missions that perform satellite servicing, active debris mitigation, in-space manufacturing, space station resupply, and planetary sample return. Passive safety analysis of a rendezvous mission of the present disclosure can be used to evaluate the total probability of collision in the event that the maneuvering chaser spacecraft experiences a fault that results in a complete or partial loss of maneuvering capability. Some key factors the present disclosure considers in determining the passive safety of the rendezvous mission can include a chosen approach trajectory, state estimations of the spacecraft and target, and probability of collision calculation such as the avoidance regions. Further, orbital rendezvous and proximity operations are an important process of accomplishing mission objectives, such that, orbital rendezvous is a key technology for space exploration. Wherein, orbital rendezvous provides or allows humans to get to the moon, assemble and supply space stations, and repair the Hubble space telescope, by non-limiting example. In fact, the drift-based rendezvous control systems and methods of the present disclosure can be applied satellite servicing, orbital debris removal, in-space manufacturing, space station re-supply, and planetary science sample return missions. Wherein for each of these missions, the operation managers will have to decide what level of risk is acceptable, and what steps they can take to reduce the risk.

Safe rendezvous continues to be a "real problem" for the space industries, despite the numerous precautions to reduce mission risk. Over the last few years there have been several orbital rendezvous failures. For example, in 1997, an unmanned Russian Progress resupply spacecraft collided with the Mir space station forcing astronauts onboard to seal off sections of the station. That same year, the ETS-VII rendezvous and docking demonstration spacecraft experienced multiple anomalies during the final phases of rendezvous. In 2005, DARPA's Demonstration of Autonomous Rendezvous Technology (DART) mission experienced a fault that resulted in a collision. Thus, the drift-based rendezvous control systems and methods of the present disclosure provide mission stakeholders with an indication of mission risk, and just as important, provide solutions to address safe rendezvous risks.

Figure 1D:
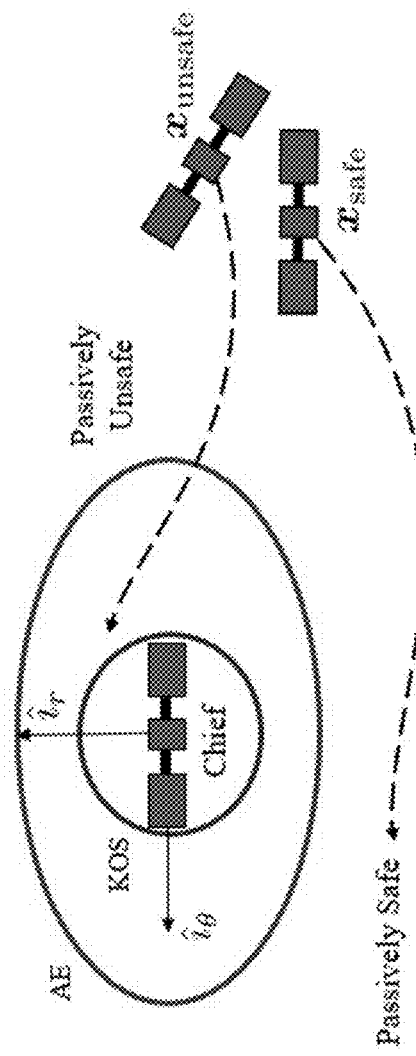
FIG. 1D is a schematic illustrating trajectories that are passively safe and passively unsafe with respect to an approach ellipsoid (AE) and a keep-out sphere (KOS), according to some embodiments of the present disclosure.

FIG. 1D is a schematic illustrating trajectories that are passively safe and passively unsafe with respect to an approach ellipsoid (AE) and a keep-out sphere (KOS). Passive safety is a guarantee that during rendezvous a chaser spacecraft avoids a collision with its target in the event of a complete loss of control, that is, the spacecraft would, in the absence of control, naturally evolve over time in a manner that does not collide with the target.

Figure 1E:
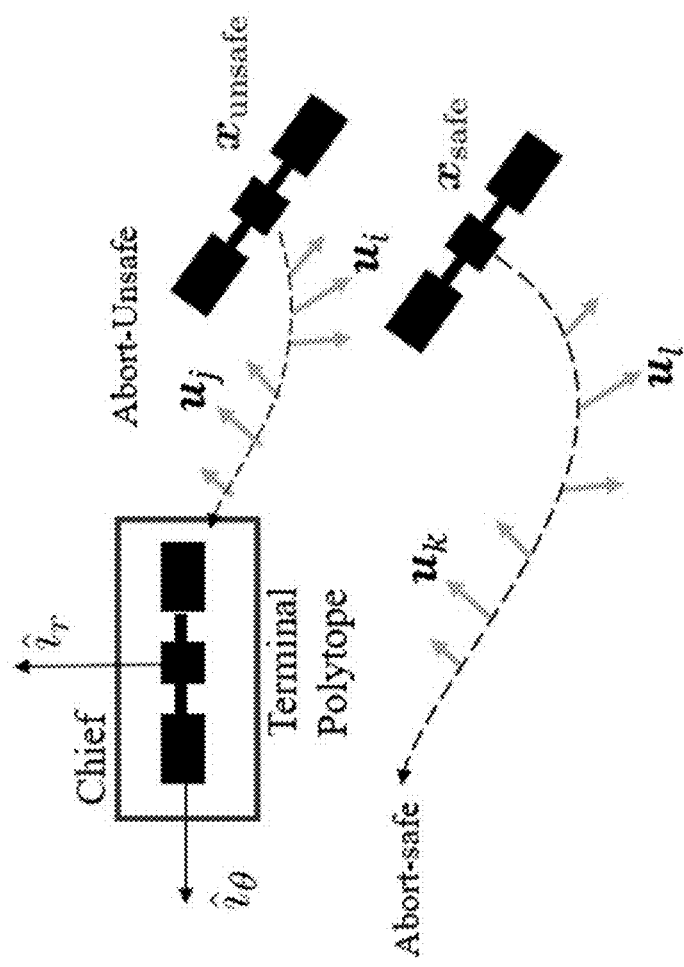
FIG. 1E is a schematic illustrating trajectories that are abort-safe and abort-unsafe with respect to terminal polytope, according to some embodiments of the present disclosure.

FIG. 1E is a schematic illustrating trajectories that are abort-safe and abort-unsafe with respect to terminal polytope. Abort safety is a guarantee that during rendezvous, if there is partial loss of control, safe abort maneuvers exist and thus a chaser spacecraft can avoid a collision with the target.

Figure 1F:
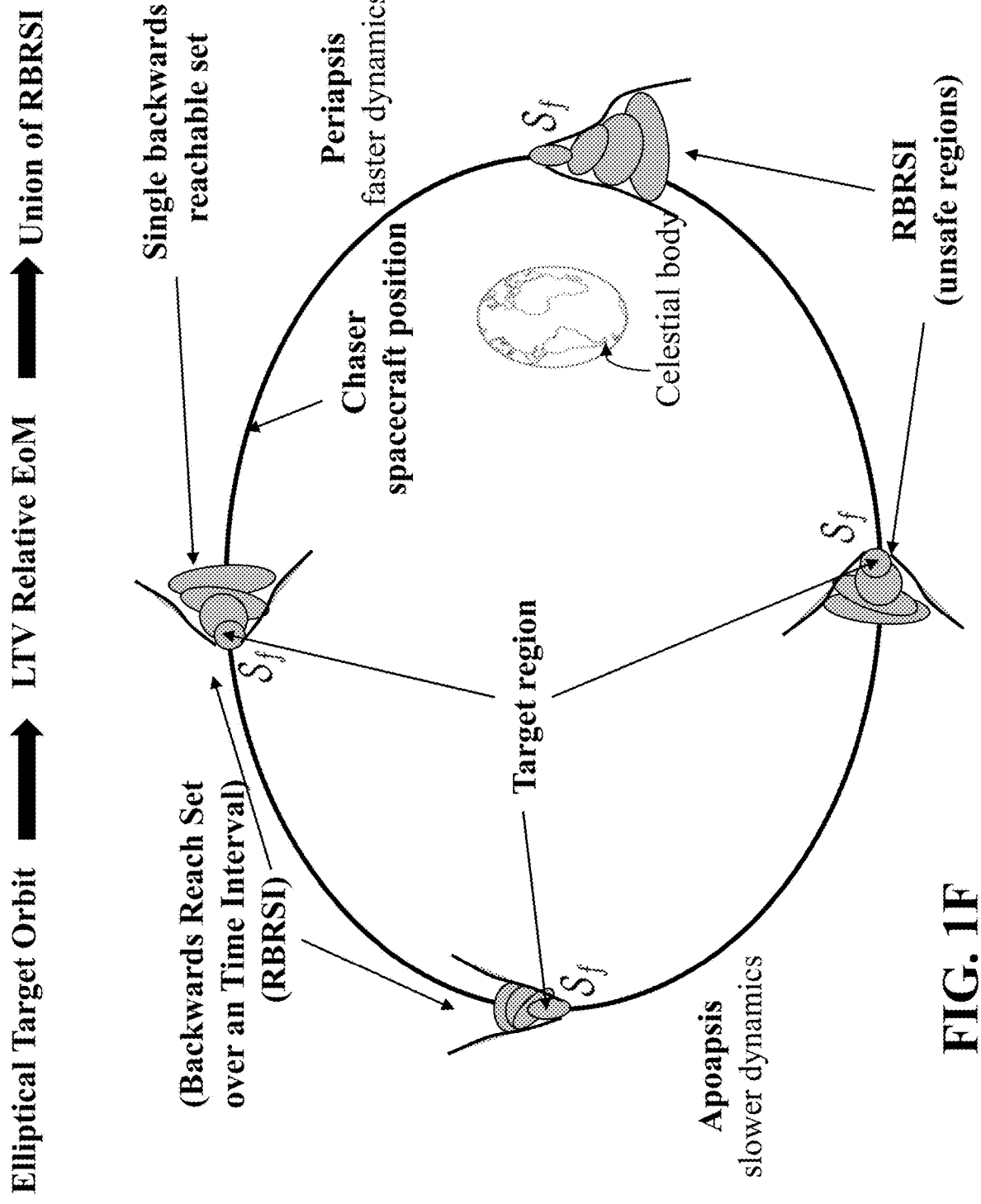
FIG. 1F is a schematic illustrating a representation of multiple backward reachable sets for multiple specified time periods projected onto a target orbital frame, according to some embodiments of the present disclosure.

FIG. 1F is a schematic illustrating a representation of multiple robust backward reachable sets for multiple specified time periods projected onto a target orbital frame, according to some embodiments of the present disclosure; A single backward reachable set of a target region at $\Delta T$ seconds before tf is shown projected onto a target orbital frame, according to some embodiments of the present disclosure. States in the $\Delta T$ backwards reachable set of the target region flow into the target region in $\Delta T$ seconds.

Still referring to FIG. 1F, the concepts from reachability (such as backwards reachable sets) and receding-horizon control are combined to design an online trajectory generation algorithm that produces safe rendezvous trajectories for a chaser spacecraft to its target on generic elliptic orbits. For achieving abort-safety, we compute the robust backwards reachable set over a time interval (RBRSI) from the target to determine the regions of state-space which for all admissible control sequence are steered to the target, thus corresponding to unsafe areas in which, in the event of partial loss of control, characterize the states that would lead to collision no matter the remaining available thrust. Thrust failure scenarios, i.e. predetermined subsets of a number of operational thrusters, are encoded in admissible control sets and are treated as if the control was a disturbance, that is, the RBRSI are computed for all possible controls in the admissible set. Thus, the RBRSI determine the regions of state-space for which all possible control sequences end up at the target within a specified time-period, i.e., no feasible evasive abort maneuvers exist.

Still referring to FIG. 1F, for computational tractability, the nonlinear relative equations of motion about the target's generic elliptic orbit around a celestial body are linearized, resulting in a set of linear time-varying (LTV) relative equations of motion (EoM). The LTV nature of the system means that the dynamics of a chaser spacecraft in the vicinity of periapsis (closest point to the central body) behave differently than at apoapsis (farthest point to the central body). Due to the LTV nature of the system, exact computation of the RBRSI is impossible, hence we conservatively approximate the unsafe region with offline computation of the union of RBRSI along the target's entire orbit. The union of RBRSI determines the unsafe region to be avoided, which is formulated as safety constraints for the online trajectory generation process.

Still referring to FIG. 1F, a model predictive control (MPC) policy is developed that enforces that the chaser spacecraft avoids the unsafe region as it rendezvous with a target or target region, thus ensuring that the chaser spacecraft remains outside of the union of RBRSI, and hence guaranteeing that in the event of a partial loss of control abort maneuvers exist and the chaser spacecraft thrusters can be operated in a manner in which the chaser spacecraft never collides with the target. The MPC policy can be referred to as an abort-safe MPC policy, an abort-safe control policy, a safe controller, throughout the disclosure.

Figure 2:
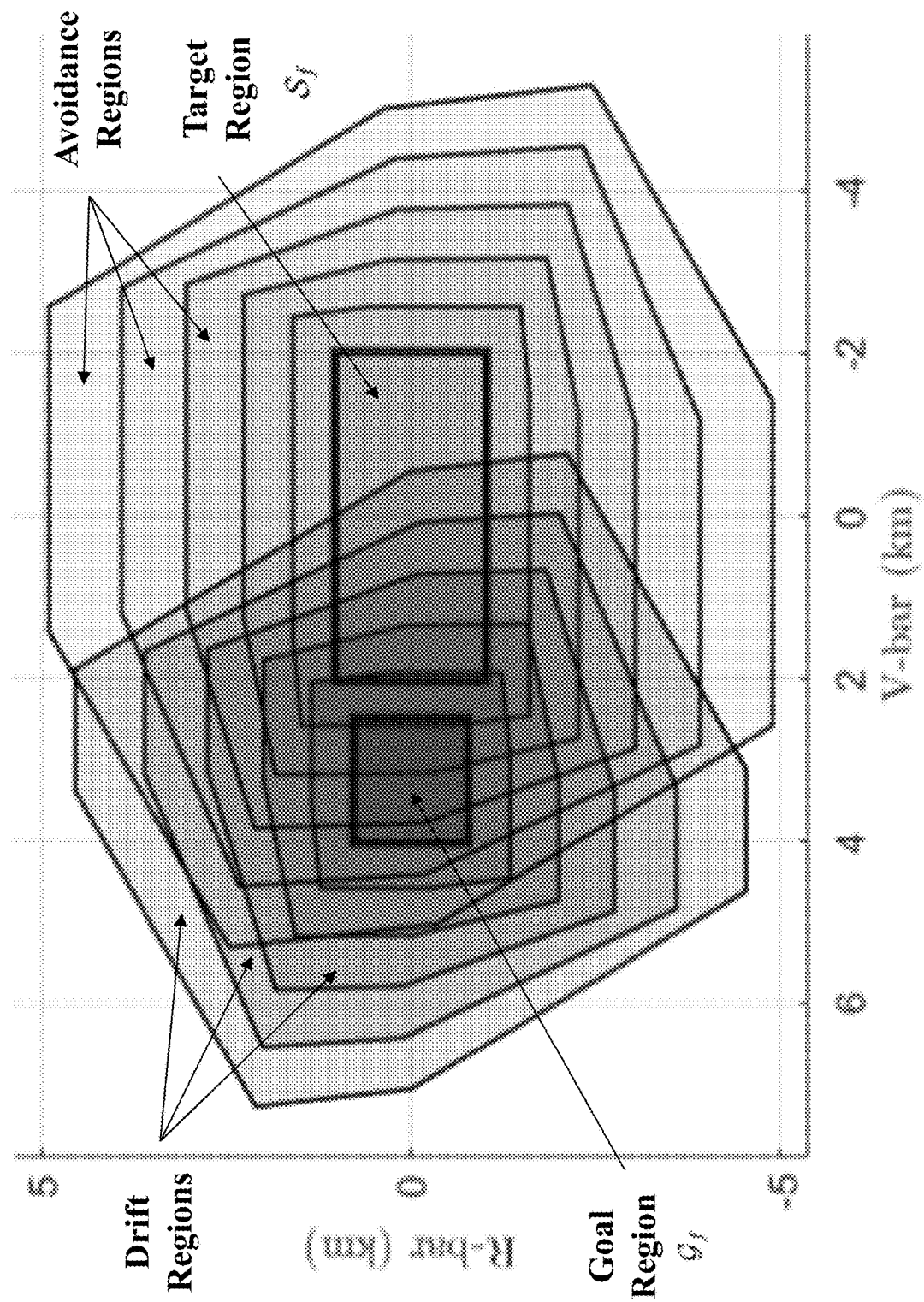
FIG. 2 is a schematic illustrating a representation of backward reachable sets (BRSs) projected onto a target orbital frame, showing drift regions emanating from a goal region and avoidance regions emanating from a target region, according to some embodiments of the present disclosure.

Referring to FIG. 2, we develop an approach that yields passive or abort-safe trajectories that can be used in an online manner while reducing thruster on-off switches and the total delta-V consumed. We leverage reachability theory, resulting in a methodology that engages our thrusters less often and often also reduces the total delta-V of the maneuver. We define a goal region that is near the target region. Computing the backwards reachable sets of the goal region results in drift regions, which are sets of states that naturally drift into the goal region in a certain number of steps. Since the target and goal regions are close to each other, due to the dynamics of the problem, the drift regions and avoidance regions tend to have non-empty intersections, which makes avoiding the unsafe avoidance regions while entering the drift regions challenging. For visualization purposes, we project the avoidance and drift regions onto a two-dimensional space in FIG. 2.

SPACECRAFT MODEL: Consider a target and a chaser in orbit around either a single central body, e.g., Earth or around two primary bodies, e.g. Earth and the Moon. The frame $F_e$ is the Earth-Centered Inertial (ECI) frame, e is an unforced particle, and it is assumed that e is collocated with the center of the Earth. The Synodic frame is given by $F_s = \{\hat{i}_s, \hat{j}_s, \hat{k}_s\}$; $\hat{i}_s$ points from the primary to the secondary body, $\hat{k}_s$ is parallel to the system momentum, and $\hat{j}_s$ completes the right-hand rule. The chaser and target's center of masses are denoted by c and t, respectively, and have spacecraft-fixed frames $F_c$ and $F_t$. In the two-body problem, the target's orbit frame $F_o = \{\hat{i}_r, \hat{i}\theta, \hat{i}_h\}$ is Hill's frame with radial, along-track, and cross-track basis vectors.

In this work, we assume the chaser is controlled and its fixed-frame is aligned with the target's orbital frame $F_o$, i.e. $\omega_{c/o}=0$, for the two-body problem and its frame is aligned with the Synodic frame for the three-body problem i.e. $\omega_{c/s}=0$. This is done for simplicity and since attitude dynamics and control are much faster than the corresponding orbital dynamics and control. Both spacecraft are assumed to be rigid bodies and all external forces act on the spacecraft's center of masses.

The position of spacecraft i relative to primary body j is given by $r_{ij}=r_i-r_j$. The relative position of the chaser spacecraft with respect to the target is denoted $\rho=r_c-r_t$, while $\dot{\rho}=r_d'-r_c'-\omega_{k/l}\times\rho$ is the relative velocity vector as seen by a frame $F_k$. Given a three-body system containing the Earth, Moon, and a spacecraft i, the nonlinear relative equations of motion for two spacecraft orbiting two primary bodies e.g. the Earth and Moon, as seen by a rotating frame $F_k$ are given by $$\ddot{\rho}=r''_d-r''_c-\dot{\omega}_{k/l}\times\rho-\omega_{k/l}\times(\omega_{k/l}\times\rho)-2\omega_{k/l}\times\dot{\rho} \quad (1)$$

where $$r''_i = -\frac{\mu_e r_{ie}}{\|r_{ie}\|_2^3} - \frac{\mu_m r_{im}}{\|r_{im}\|_2^3} + \frac{f_i}{m_i} \quad (2)$$

are the inertial accelerations of the chaser and target spacecraft, $i\in\{c,t\}$, respectively. The vector $f_i$ represents perturbing forces acting on the spacecraft i, which include orbital perturbations as well as control. In this work, we choose to realize the three-body equations of motion in the Synodic frame $F_s$. Note that if the lunar gravitational acceleration in (2) is neglected, $F_j=F_e$, $m_i \ll m_e$, and $F_k=F_o$, we obtain the nonlinear relative equations of motion for a target orbiting a single primary body.

Since linearized dynamics dominate around some nominal trajectory, we can describe the relative motion of a chaser with respect to the nominal trajectory by linearizing (1) about $x_t(t)$. The variation $\delta x = x_c - x_t$, provides the relative state of the chaser with respect to the target's nominal trajectory. The resulting equations are generally expressed by an LTV system $$\dot{x}(t)=A(t)x(t)+Bu(t), \quad (3)$$

where $x=\delta x$, and $u={}^k f_c$ is the chaser's control input expressed in $F_k$. In this work we consider a discrete time formulation of (3) with sampling period $\Delta t$, which is assumed to be small enough not to lose significant behavior between samples $$x_{k+1}=f(k,x_k,u_k)=A(k)x_k+B(k)u_k \quad (4)$$

REACHABLE SETS AND SAFETY: Referring back to FIG. 1F, safety with respect to loss of thrust is enforced by maintaining the chaser vehicle outside of the unsafe region of state-space, that is, the region where if a failure occurs, a safe abort does not exist. We determine the unsafe regions by computing the robust backwards reachable sets (RBRS) given the target set. In the case of abort-safety, admissible control sets are used to obtain the set of states for which there exists no collision avoidance maneuver. Thus, when the failure occurs and the state is in the RBRS, no admissible control exists to avoid collision.

Definition 1: Given $x_{k+1}=f(k, x_k, u_k)$, a convex admissible control set U where $u \in U$, and final time $t_f$, the N-step robust backward reachable set $\mathcal{R}_b(N; \mathcal{S}_f, \mathcal{U}, t_f)$ of target region $\mathcal{S}_f \subseteq \mathbb{R}^n$ is $$\mathcal{R}_b(0; \mathcal{S}_f, \mathcal{U}, t_f) = \mathcal{S}_f \quad (5)$$

$$\mathcal{R}_b(j; \mathcal{S}_f, \mathcal{U}, t_f) = \{x \in \mathbb{R}^n : f(t_f-j, x, u) \in \mathcal{R}_b(j-1; \mathcal{S}_f, \mathcal{U}, t_f), \forall u \in \mathcal{S}\}$$

Still referring to FIG. 1F, here the RBRS is the set of initial conditions at time $t_0 = t_f - N$ from which the chaser will not be able to avoid collision at time $t_f$, regardless of the admissible control sequence applied.

Definition 2: The robust backwards reachable set over the time interval $[t_0, t_f]$ (RBRSI), where $t_0 = t_f - N$, is the union of the j-steps RBRS, $$\mathcal{R}_M(\mathcal{S}_f, \mathcal{U}, t_f) = U_{j=0}^N \mathcal{R}_b(j; \mathcal{S}_f, \Psi, t_f). \quad (6)$$

The RBRSI denotes the set of states $x^-$ for which there exists $t \in [t_0, t_f]$, such that from $x(t)=x^-$, the chaser will not be able to avoid collision at time $t_f$, regardless of the admissible control sequence applied.

Still referring to FIG. 1H, we account for changing final time, considering that the orbit, and hence the time-varying system, is periodic. To this end the orbit-RBRSI is the union of the RBRSI over $[t_0, t_f]$, with $t_f - t_0 = N$, for $t_f$ that varies along one orbit $$\mathcal{R}_M(\mathcal{S}_f, \mathcal{U}) = U_{t_f=1}^N \mathcal{R}_M(\mathcal{S}_f, \mathcal{U}, t_f), \quad (7)$$

where $t_p$ is the orbital period, and we assumed N<$t_p$ due to the type of spacecraft maneuver we target. By taking the union of the RBRSI for changing final time around one orbit, (7) contains sets of states for which there exists a time in the target's periodic orbit such that a collision will necessarily occur after at most N steps, $U_{j=0}^N \mathcal{R}_b(j; \mathcal{S}_f, \mathcal{U}, t_0+j)$.

We construct the unsafe set as the union of the orbit-RBRSI in (7) over the input sets U. Since some failure modes may not need to be considered, e.g., they cannot occur or the spacecraft may be re-oriented to change the location of faulty thrusters, the unsafe set is constructed from given $q \leq n_F$ input sets as $$\overline{\mathcal{R}}_N^{rdv}(\mathcal{S}_f) = U_{i=1}^q \overline{\mathcal{R}}_N(\mathcal{S}_f, \mathcal{U}_i). \tag{8}$$

In (8), it is enough to consider all input sets that are not supersets of others, i.e., $\{\mathcal{U}_i; i, j \in \{1, \ldots q\}, \nexists j \leq i, \mathcal{U}_i \supseteq \mathcal{U}_j\}$, so that we can ignore the input set for nominal conditions. Hence the safe set with respect to q failure modes is given by $$\mathcal{X}_{N,q}^{safe} = \overline{\mathcal{R}}_N^{rdv}(\mathcal{S}_f)^c \tag{9}$$

The above equations provide general expressions for the unsafe sets that rely only on a compact terminal set. Explicit computation of these sets can be done by assuming the terminal set is of a particular form e.g. a polytope or an ellipsoid.

When the dynamics are linear as in (3) and the target set $S_f$ is a polytope, the RBRS is also a polytope and is computed by solving linear programs. Hence the unsafe set is comprised of a union of polytopes that are computed to consider the LTV nature of the equations of relative motion as well as several possible admissible input sets, to capture multiple failure modes. Consider the target set $P_f = P(H_f, k_f)$. Let the j-steps RBRS from final time $t_f$ be $\mathcal{R}_b(j; \mathcal{P}_f, \mathcal{U}, t_f) = \mathcal{P}(H_j, k_j)$, the j+1-steps RBRS is $\mathcal{R}_b(j+1; \mathcal{P}_f, \mathcal{U}, t_f) = \{x \in \mathbb{R}^n: H_{j+1} x \leq k_{j+1}\}$, where $$H_{j+1} = H_j A(t_f-(j+1)), \tag{11a}$$

$$[k_{j+1}]_i = \min_{u \in \mathcal{U}}[k_j]_i - [H_j]_i B(t_f - (j+1))u, \tag{11b}$$

In practice, additional linear programs to the ones in (11b) are solved to remove redundant hyperplanes for obtaining a minimal representation of $P(H_j, k_j)$. The polytopic orbit-RBRSI in (7) can be computed accordingly.

If we let the terminal set be defined by a polytopic set, such that, $S_f = P_f$, then the passive backwards reachable sets (PBRS) are also all polytopic, since polytopes are closed under affine transformations. Computing the PBRS is computationally much less demanding than the RBRS as no LPs need to be solved. If $t_j = t_f - j$, and the state transition matrix from $t_j$ to $t_f$ is $\Phi(t_f, t_j)$, then the j-steps PBRS polytope is $$\mathcal{R}_b(j; \mathcal{P}_f, \{0\}, t_f) = \{x \in \mathbb{R}^n: H_f \Phi(t_f, t_f-j) x \leq_k f\}, \tag{12}$$

which can be computed recursively or by simply iterating on $t_j$.

If instead of a polytope, the target is defined as an ellipsoidal $E_f$, the resulting PBRS will also be ellipsoidal since ellipsoids are closed under affine transformations. The j-steps ellipsoidal passive backwards reachable set is given by $$\mathcal{R}_b(j; \varepsilon_f, \{0\}, t_f) = \{x \in \mathbb{R}^n: x^T \Phi(t_f, t_f-j)^T P^{-1} \Phi(t_f, t_f-j) x \leq 1\}. \tag{13}$$

DRIFT REGIONS: Referring back to FIG. 2, nominally, the RBRSI are used to define the passively unsafe state-space, e.g. the avoidance regions. However, the same technique can be used to compute the RBRSI given a terminal set, which we denote the final goal set $G_f$. The RBRSI emanating from this terminal set, $\mathcal{R}_N(\mathcal{G}_f, \{0\}, t_f)$, also called the drift regions, would define the set of states that enter $G_f$ in at most N steps at the final time $t_f$. In particular, we define a goal set such that $G_f \cap S_f = \emptyset$. Naturally, the states in $\mathcal{R}_N(\mathcal{G}_f, \{0\}, t_f)$ need not be passively safe. That is, for some $\delta t > 0$, there may exist a state $x(t) \in G_f$ such that $x(t+\delta_t) \in S_f$ or vice-versa: there may exist a state $x(t) \in S_f$ such that $x(t+\delta_t) \in Gf$. Given the former scenario, we note that $$\mathcal{G}_f \cap \mathcal{R}_N(\mathcal{S}_f, \{0\}, t_f) \neq \emptyset \tag{14}$$

$$\Rightarrow \mathcal{R}_N(\mathcal{G}_f, \{0\}, t_f) \cap \mathcal{R}_N(\mathcal{S}_f, \{0\}, t_f) \neq \emptyset \tag{15}$$

where the complexity of the intersection computation will depend on the geometric properties of the sets used. If $S_f = P(H, k)$ and $G_f = P(H_g, k_g)$, then one can check if any polytope in (14), which in H-rep is $$\left\{x: \begin{bmatrix} H_g \\ H\Phi(t_f, t_f-j) \end{bmatrix} x \leq \begin{bmatrix} k_g \\ k \end{bmatrix}\right\} \tag{16}$$

is minimal and non-empty.

Still referring to FIG. 2, from a coasting-arc and passive safety perspective, if $\mathcal{R}_N(\mathcal{G}_f, \{0\}, t_f) \cap \mathcal{R}_N(\mathcal{S}_f, \{0\}, t_f) \neq \emptyset$, then one can drive the chaser into $\mathcal{R}_N(\mathcal{G}_f, \{0\}, t_f)$ without passive safety constraints, yielding a coasting arc that takes the chaser spacecraft towards the target in an inherently passively safe approach for an N-step maneuver. Under the assumption that (15) is indeed non-empty, we formulate a method for the chaser spacecraft to enter the passively safe portion of $\mathcal{R}_N(\mathcal{S}_f, \{0\}, t_f)$ defined by $$\mathcal{D} = \mathcal{R}_N(\mathcal{G}_f, \{0\}, t_f) \backslash (\mathcal{R}_N(\mathcal{S}_f, \{0\})) \tag{17}$$

without explicitly computing the set difference. The set D is herein denoted as the drift set and represents the set of states that enter $G_f$ at $t_f$ in N steps or less, of length $\Delta t$, which are passively safe.

Since we consider the general linearized equations of motion (3) of an LTV form, entering $G_f$ becomes a timing-problem where the state of the chaser x has to be an element of the correct $\mathcal{R}_b(j, \mathcal{G}_f, \{0\}, t_f) \subset \mathcal{R}_N(\mathcal{G}_f, \{0\}, t_f)$ to ensure a coasting arc from an initial (or current) time $t_j$ to a final time $t_f$. That is, if $t_j = t_f - j\Delta t$, and $x(t_j) \in \mathcal{R}_b(k, \mathcal{G}_f, \{0\}, t_f)$ where $j \neq k$, there are no guarantees that $x(t_f) \in G_f$. As such, to obtain a successful coasting arc, given an initial maneuver time $t_0$, we specify a fixed final coasting time $t_d$ at which we enter the goal set, which is equivalent to specifying a maximum maneuver duration $t_m = t_d - t_0$. The resulting maximum number of coasting steps is $$N_c = \frac{t_m}{\Delta T}.$$

The following constraints for our discrete-time system $$x(t_j) \in \mathcal{R}_b(j, \mathcal{G}_f, \{0\}, t_d), j \in \{0, \ldots, N_c\} \tag{18}$$

where $tN_c = t_d$. Since $x(t_0) \notin \mathcal{R}_{N_c}(\mathcal{G}_f, \{0\}, t_d)$ to begin with, some of these constraints will be infeasible. Once a constraint in (18) is satisfied, the chaser will passively drift, in a safe manner, to $G_f$ in j steps.

In the event the linearized equations of motion (3) are an LTI system, there is some additional flexibility in designing a coasting arc from some initial time to a final time. The same method can be used where a fixed final time and maximum coasting maneuver duration is chosen. However, in this case, the dynamics allow us to relax the timing issue above, resulting in a free final time method. In particular, $\mathcal{R}_b(k, \mathcal{G}_f, \{0\}, t_f)$ is no longer dependent on the absolute final time $t_f$ i.e. it is sufficient to utilize $\mathcal{R}_b(k, \mathcal{G}_f, \{0\})$ to form the RBRSI in (6) and consequently, the orbit-RBRSI (7) from a coasting and passive safety perspective. Then, if $x(t_j) \in \mathcal{R}_b(k, \mathcal{G}_f, \{0\})$, the chaser is guaranteed to enter the goal set in k-steps given the current or initial time $t_j$.

Figure 4:
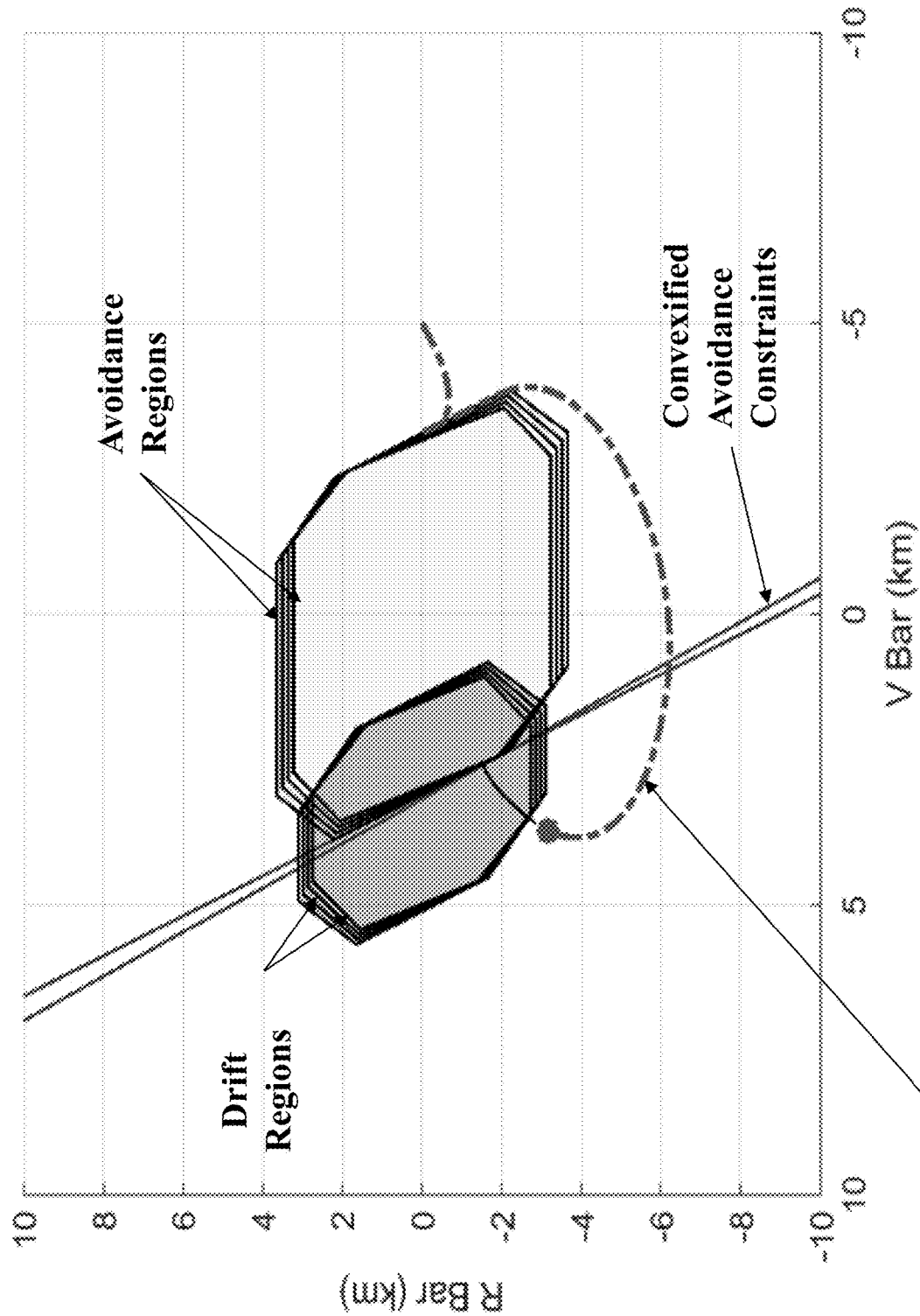
FIG. 4 is a schematic that shows a spacecraft trajectory that enters the drift regions and avoids the avoidance regions using convexified avoidance constraints, according to some embodiments of the present disclosure.

DRIFT-BASED RENDEZVOUS CONTROL: Referring to FIG. 4, to achieve successful rendezvous while satisfying our passive, abort, and coasting-arc constraints, a model predictive control (MPC) policy is used to generates optimal trajectories, with respect to our performance metric, in an online manner. FIG. 4 is a schematic illustrating a representation of the result of the MPC policy that controls the spacecraft so that the trajectory avoids the avoidance regions while entering the drift regions.

Still referring to FIG. 4, specifically, we develop a model predictive control (MPC) policy that generates a trajectory constrained to remain within the safe state-space and enters a drift set for the passively safe approach phase. minimizing a cost function designed based on performance metrics.

The MPC policy solves the optimal control problem $$\min_{U_t} E(x_{N_p|t}) + \sum_{k=0}^{N_p-1} F(x_{k|t}, u_{k|t}, s_{k|t}) \quad (19a)$$

$$s.t. x_{k+1|t} = A(t+k)x_{k|t} + B(t+k)u_{k|t} \quad (19b)$$

$$g_t(x_{k|t}, u_{k|t}, s_{k|t}) \leq 0 \quad (19c)$$

$$u_{k|t} \in \mathcal{U}(t) \quad (19d)$$

$$x_{0|t} = x_t \quad (19e)$$

$$s_{k|t} \geq 0 \quad (19f)$$

where $N_p$ is the prediction horizon length, the prediction model (19b) is (4), (19c) is the constraint ensuring that collision can be averted in presence of propulsion system failures, and $\mathcal{U}(t) \in \{\mathcal{U}_i\}_i$ is the input set at time t, which depends on the propulsion system condition. Since the control sequence over the horizon is $U_t = (u_{0|t} \ldots u_{N_p-1|t})$, the following control is applied as an input $$u_t = k_{mpc}(x_t) = u^*_{0|t} \quad (20)$$

where $U^*_t = (u^*_{0|t} \ldots u^*_{N_p-1|t})$ is the optimizer of (19a).

CONSTRAINTS: Passive-Safety: We implement a local convexification approach, based on computing a tangent to the passive backwards reachable ellipsoids and then enforcing a half-space constraint to ensure that $x \notin \bar{\mathcal{R}}_N(\mathcal{E}_f, t_f)$.

Figure 3:
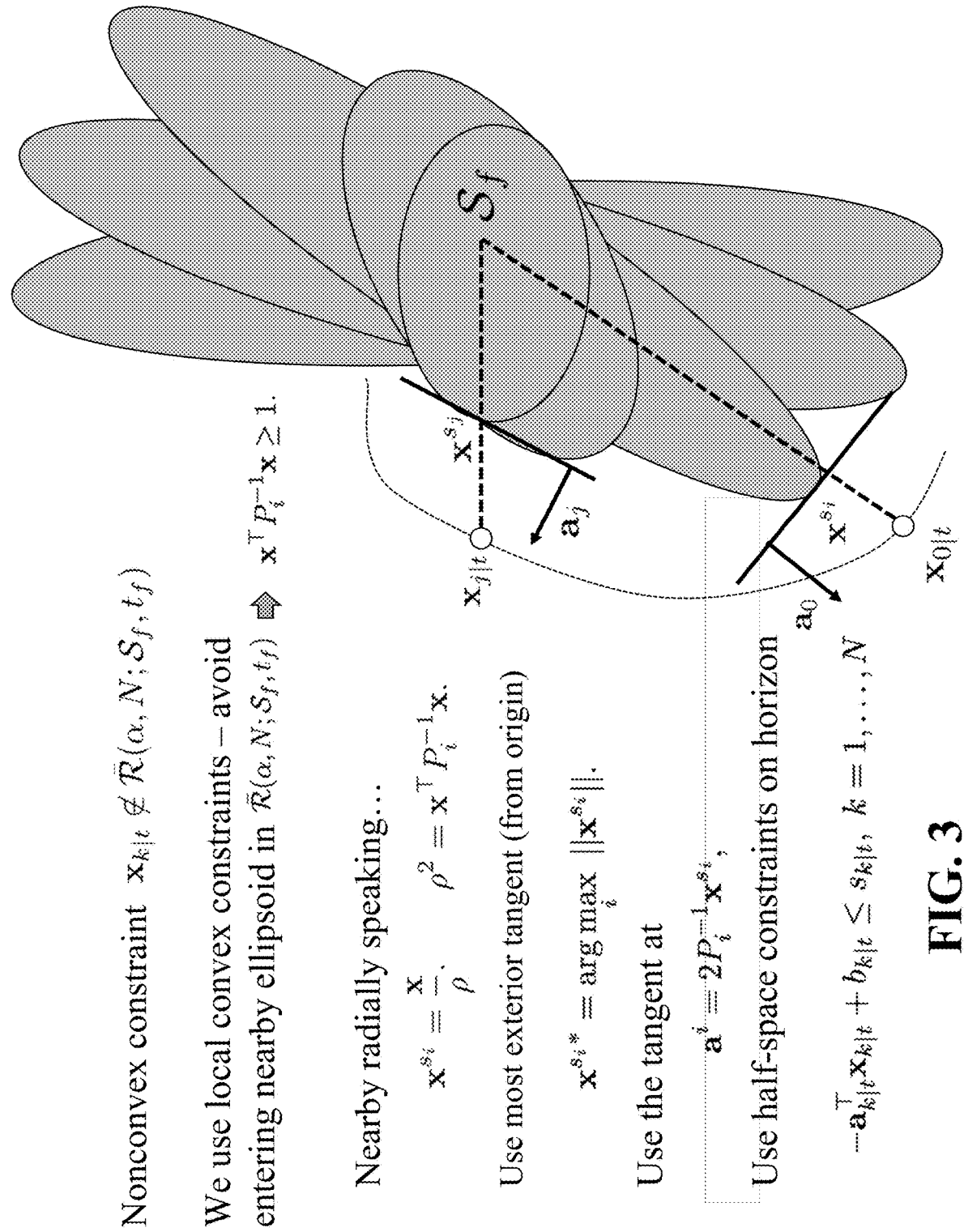
FIG. 3 is a schematic illustrating how to enforce the safety, according to some embodiments of the present disclosure.

FIG. 3 is a schematic illustrating how to use local convexification to formulate the passive safety constraints, according to some embodiments of the present disclosure. The following describes how the local convexification method works.

The tangent hyperplanes are computed by projecting the state x radially onto the ellipsoids. The radial distance from the state to the surface of the ellipsoid $\mathcal{E}_i$ is $$\rho = x^T P_i x \quad (21)$$

Still referring to FIG. 3, normalizing the state x by $\rho$, results in the closest state on the ellipsoid surface $$x^{s_i} = \frac{x}{\rho} \quad (22)$$

Still Tangent hyperplane to the ellipsoid surface at $x^{s_i}$ is defined by the normal vector $$a_i = 2 P_i x^{s_i} \quad (23)$$

since $P_i = P_i^T$, so that the tangent hyperplane is $$\cdot \{x \in \mathbb{R}^6 : a_i^T x = a_i^T x^{s_i} = b^i\}.$$

Still referring to FIG. 3, given a state x at time t, we compute projections $x^{s_i}$ for all ellipsoids $\mathcal{E}_i \in \bar{\mathcal{R}}(t; \mathcal{S}_f, t_f)$. Due to the possibly large number of ellipsoids, rather than imposing half-space constraints for all of them and then selecting the ellipsoid based on the point that is furthest away from the origin by selecting i such that $$x^{s_i*} = \arg\max_i \|x^{s_i}\|.$$

ABORT-SAFETY: While ideally (19c) could be implemented simply as $x_{k|t} \in X_N^{safe} = \bar{\mathcal{R}}_N^{rdv}(\mathcal{P}_f)^c$ such a constraint is non-convex and will make (19) hard to solve numerically. Instead, we impose constraints on the state to remain outside of (8) by computing a hyperplane that excludes (8) from the feasible space of (19). Given a subset of the polyhedra $\{\mathcal{P}(H_i, \bar{\mathcal{R}}, k_i, \bar{\mathcal{R}})\}_{i=1}^l$ within $\bar{\mathcal{R}}_N^{rdv}(\mathcal{S}_f)$ where $H_i \bar{\mathcal{R}} \in \mathbb{R}^{n_{c_i} \times n}$, we construct a half space $\mathcal{P}_h(h, 1) = \{x \in \mathbb{R}^n : hx \leq 1\}$ such that $\mathcal{P}^h(h, 1) \supset \{\mathcal{P}(H_i, \bar{\mathcal{R}}, k_i, \bar{\mathcal{R}})\}_{i=1}^l$. Given $\bar{x} \in \mathbb{R}^n$, $h^*(\bar{x}), \{\lambda^*_i(\bar{x})\}_{i=1}^l, s^*(\bar{x})$ is the solution of a linear program. Furthermore, any feasible solution of this linear program is such that $\bar{x} \in \mathcal{P}_h(h, 1)$.

Referring back to FIG. 4, for both passive and abort-safety, the hyperplanes are computed based on the previously predicted state trajectory. Let $(x_{0|t-1} \ldots x_{N_p|t-1})$ be the trajectory computed at time t−1, where $x_{k|t}$ denotes x predicted k steps ahead from t. Then, we can compute $h_{k|t}$ using the ellipsoidal-based tangent method for passive safety or the half-space inclusion method for abort-safety, using $x_{k+1|t-1}$ as a prediction for $x_{k|t}$.

DRIFTING: As mentioned earlier, enforcing the drift constraints throughout the horizon is generally implemented as in (18). We let $G_f$ be a polytope with known H-rep, and consequently, the PBRS is given by $$\mathcal{R}_b(j, \mathcal{G}_f, \{0\}, t_d) = \mathcal{P}(H_g \Phi(t_d, t_d-j), k_g). \quad (24)$$

In order to target the right drift set at the right time, given the current time t, we enforce $$H_g \Phi(t_d, k+t) x_{k|t} \leq \gamma k_g + \mathbf{1} s_{k|t}, \forall k \in \{0, \ldots, N_p\}, \quad (25)$$

where the slack variable skit is used to avoid infeasibility since $x(t_0) = x_0 \notin \mathcal{R}_N(\mathcal{G}_f, \{0\}, t_d)$ and $\gamma \in [0, 1)$ tightens the constraint to target the interior of the drift set as opposed to the edge. We then use a penalty in the cost function to drive the chaser into the drift set.

Still referring to FIG. 4, since the coasting-arc is beneficial and useful when the chaser is far relative to the target, these drift constraints are only used in the initial rendezvous phase where passive safety is also required. Thus, in short, for the initial approach, we can write the passive safety state path constraints, $g_p$ as $$g(x_{k|t}, s_{k|t}) = \begin{bmatrix} -h_{k|t}^T x_{k|t} + 1 \\ H_g \Phi(t_d, k+t) x_{k|t} - \mathbf{1} \| s_{k|t} - \gamma k_g \end{bmatrix} \leq 0. \quad (26)$$

COST FUNCTION: In order to obtain in (19) a linear quadratic MPC, we design the stage cost and the terminal cost in (19a) as $$F(x,u,s) = x^T Q x + u^T R u + w_s s, \quad (27a)$$

$$E(x) = x^T M x \quad (27b)$$

where the weight matrices $Q = Q^T \geq 0$, $R = R^T > 0$, $M = M^T > 0$, $w_s \geq 0$ are selected to achieve the desired performance. The primary objective is to approach the target, which amounts to reaching zero position and velocity, and can be affected by Q. A secondary objective is to minimize the total required propellant, since this allows for increased payload, which often requires minimizing the thrust, and hence is affected by R. The terminal cost M is usually chosen for obtaining stability properties, although here these are less relevant due to the formulation aiming at ensuring safety should a thruster failure occur. Note that non-quadratic cost functions can also be used since this has no impact on the satisfaction of the safety constraint. Note that the relative weights w2>>w1 drive the optimization problem solution to minimize the drift set constraint violation i.e. $s_{k|t} \to 0$, leading $x_{k|t}$ to enter $R(S_d)$.

EXPERIMENTAL OR SIMULATION RESULTS: To demonstrate the effectiveness of drift-based rendezvous control, simulation results are presented.

Figure 5:
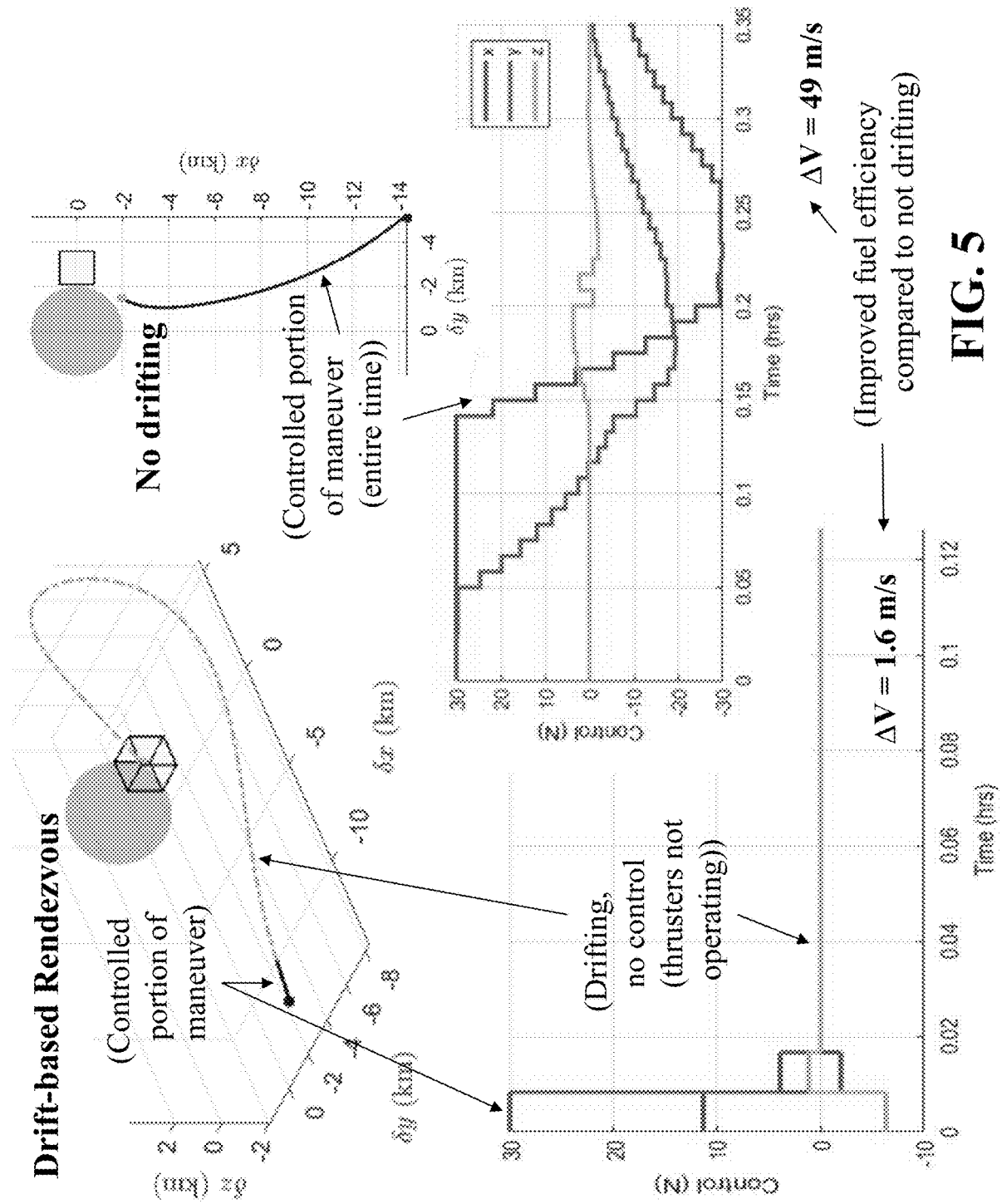
FIG. 5 is a graph illustrating the drift-based rendezvous control policy compared with a control policy that does not drift, highlighting the reduced usage of the thrusters and improved fuel efficiency of the drift-based rendezvous control policy, according to some embodiments of the present disclosure.

FIG. 5 is a graph illustrating a comparison between drift-based rendezvous control and control without using the drift regions. On the left the drift-based rendezvous control has a short period of active control in order to enter the drift regions at which point the thrusters are turned off and no longer operate, allowing the spacecraft to coast for a long period of time without having to pulse the thrusters and ultimately saving a lot of fuel compared to the case on the right, where the spacecraft is controlled the entire length of the maneuver, requiring constant pulsing of the thrusters and ultimately using a lot of fuel in order to rendezvous with the target region.

Figure 6:
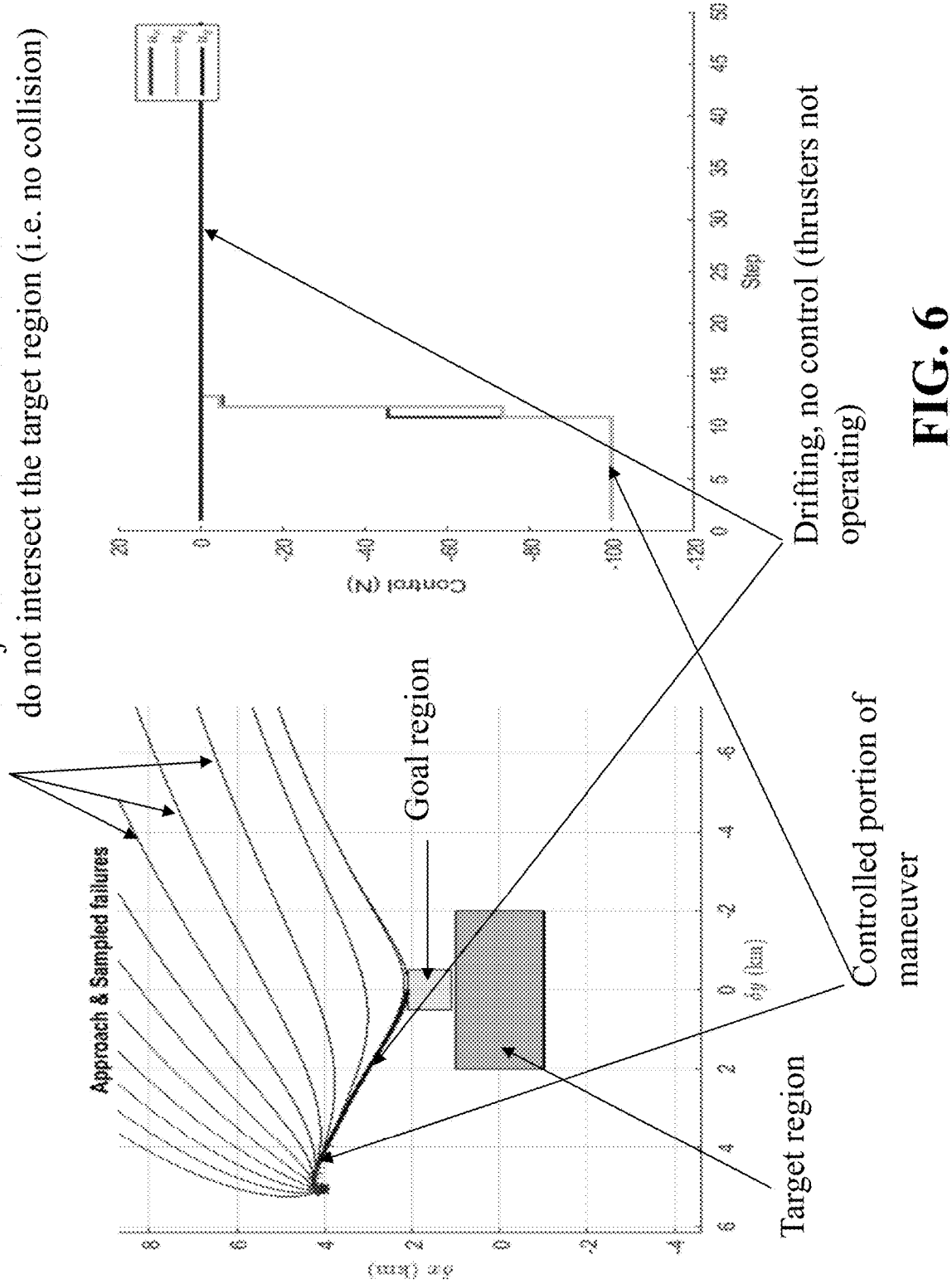
FIG. 6 is a graph illustrating that during the controlled portion of the drift-based rendezvous control policy, the spacecraft is passively safe in the event of total thruster failure such that no resulting free-motion trajectories enter the target region, according to some embodiments of the present disclosure.

FIG. 6 is a graph illustrating a that drift-based rendezvous control is also safe. During the controlled portion of the maneuver, the spacecraft is simulated to have all of its thrusters fail. Shown are the failure natural motion trajectories that emanate from the controlled spacecraft trajectory. All of them are passively safe, that is, they do not intersect with the target region. Once the spacecraft has entered the drift regions (not shown), the thrusters are turned off and the rest of the spacecraft maneuver is a free natural drift to the goal region, consuming no fuel as seen in the plot on the right.

Other Aspects

Some aspects of the present disclosure included combining concepts from reachability and model predictive control (MPC), to design an online trajectory generation algorithm that produces passively safe rendezvous trajectories for the spacecraft to its target on generic elliptic orbits. Reachability studies assist in solving the problem of determining the subset of the state space which can be steered via an admissible control sequence to any given target set, while guaranteeing that the state constraints will be satisfied for all allowable disturbance sequences. By using backwards reachability, starting at the target, we can determine the set of states that lead to the target. In this case, the set of states that lead to the target without any control, are passively unsafe, that is, they naturally evolve over time in a manner that would collide with the target due to perturbations acting on the multi-object celestial system that cause motion to the spacecraft. It is a realization that unlike in most experimental applications of reachability tested that dictate a spacecraft must remain inside reachable target sets, for the aspects of the present disclosure, the reachable target sets are used to characterize unsafe or avoidance sets in state space which a chaser spacecraft must avoid. Therefore, it is a realization that by using MPC to avoid this unsafe or avoidance region, computed using backwards reachability, we can generate passively safe trajectories that, in the event of a total or partial control failure, never collide with the target.

Model predictive control (MPC) is based on an iterative, finite horizon optimization of a model of a spacecraft, a set of objectives of the motion of the spacecraft, and constraints on the spacecraft propulsion system and motion, and has the ability to anticipate future events to take appropriate control actions. This is achieved by optimizing the operation of the spacecraft according the set of objectives, over a future finite time-horizon with prediction obtained according to the model of the spacecraft subject to constraints, and only implementing the control over the current timeslot. For example, the constraints can represent physical limitation of the spacecraft, safety limitations on the operation of the spacecraft, and performance limitations on a trajectory of the spacecraft. A control strategy for the spacecraft is admissible when the motion generated by the spacecraft for such a control strategy satisfies all the constraints. For example, at time t, the current state of the spacecraft is sampled and an admissible cost minimizing control strategy is determined for a relatively short time horizon in the future. Specifically, an online or real-time calculation determines a cost-minimizing control strategy until time t+T. After the step of the control is implemented, the state is sampled again and the calculations are repeated starting from the now current state, yielding a new control and new predicted state path. The prediction horizon shifts forward, and for this reason MPC is also called receding horizon control. It is a realization that by formulating constraints in the MPC to control the spacecraft in a manner that avoids the unsafe or avoidance region calculated using backwards reachability, we can guarantee that in the event of a total or partial loss of control the spacecraft will not passively drift and collide with the target.

It is possible to use MPC alone in a brute-force approach to produce passively safe rendezvous trajectories for the chaser spacecraft to its target on generic elliptic orbits, as tested in experimentation. However, in order to do so, one needs to formulate a very large number of safety constraints that creates a very large optimization problem, and results in a very high computational burden which may not be able to be implemented in the computational resource constrained hardware in spacecraft. Furthermore, this experimental MPC would only produce a single passively safe rendezvous trajectory for the current assumed state of the chaser spacecraft. If there was any error or uncertainty with regard to the current state of the spacecraft, the safety constraints formulated in the MPC would not actually ensure safe operation of the spacecraft in the event of total or partial thruster failure for the true state. It is a realization that by combining the concepts of reachability and MPC we are able to offload the safety computations from the MPC into a separate offline (or online) computation of the unsafe regions to avoid, thereby both reducing the computational burden of and speeding up the solving of the optimization problem in the MPC, while additionally adding robustness to the method in order to categorize wide regions of safe and unsafe state space so that the MPC would guarantee safe operation (collision free rendezvous trajectories) for a large range of spacecraft states.

Another aspect for achieving passive safety, is a backwards reachable set over a time interval (BRSTI) computed from the target to determine the regions of state-space corresponding to unsafe or avoidance areas, in which, in the absence of control, a chaser spacecraft would collide with the target within a specified time-period. Passive safety is a guarantee that during rendezvous a chaser spacecraft avoids a collision with its target in the event of a complete loss of control, that is, the spacecraft would, in the absence of control, naturally evolve over time in a manner that does not collide with the target.

In order for computational tractability, another realization was that the nonlinear relative equations of motion about the target's generic orbit needed to be linearized, resulting in a set of linear time-varying (LTV) equations. Such that, due to the LTV nature of the system, an exact computation of the BRSTI is impossible. Hence, an approximation of the unsafe or avoidance region can be made with an offline computation of a union of BRSTI along the target's entire orbit. The union of BRSTI determines the avoidance region to be avoided, which is formulated as passive-safety constraints for the online trajectory generation process.

Another aspect included was using the model predictive control (MPC) policy for enforcing the passive safety constraints, so as to ensure that the spacecraft remains outside of the union of BRSTI, and results in guaranteeing collision free trajectories in the event of thruster failure either partial or full failure. The MPC policy can be referred to as a fail-safe MPC policy, a fail-safe control policy, throughout the disclosure.

The MPC policy is based on solving a receding horizon optimal control problem. For example, the MPC policy only enforces constraints that ensure passive safety. Additional constraints, e.g., on the control inputs, can also be included. The constraints enforcing linear time-varying (LTV) backwards reachable set over a time interval (BRSTI) avoidance are non-convex, since they require avoiding a union of convex sets such as ellipsoids, polytopes, or zonotopes. This significantly complicates the finite-horizon MPC optimal control problem. In fact, even an avoidance of each convex set is described by non-convex constraints. Thus, in order to address this problem a local convexification approach is implemented, based on computing a tangent to the constraints, and then enforcing half-space constraints to ensure that passive safety can be achieved by remaining in the safe set and outside the unsafe set. Half-space constraints are constraints that constrain a state to be on one side of a hyperplane, therefore in the present disclosure we often use hyperplane constraints and half-space constraints interchangeably.

In some aspects of the present disclosure, the tangent hyperplanes are computed by solving an optimization problem (linear program if the unsafe or avoidance sets are constructed with polytopes, or a second order cone program if the unsafe sets are constructed with ellipsoids) that finds a hyperplane that separates the spacecraft state from the unsafe or avoidance sets.

In another aspect of the present disclosure, the tangent hyperplanes are computed by projecting the current chaser spacecraft state radially onto the ellipsoids, selecting the furthest radial projection, and calculating the tangent hyperplane at the radial projection point. The radial distance from the current spacecraft state to the surface of the ellipsoid is calculated by normalizing the current spacecraft state by the shape matrix corresponding to each ellipsoid, resulting in the closets state on the ellipsoid surface.

In one aspect of the present disclosure, the half space constraints are formulated as a chance constraints which requires that the half space constraint be satisfied with at least a priori specified probability level due to an uncertainty regarding a position of the vehicle or the target, and/or an uncertainty of a thruster magnitude or a direction. In effect, the half space constraints are "tightened" based on a priori specified probability level and the covariance of the uncertainty so that they move away from the unsafe region boundary, giving a buffer region to account for the possibility that the expected spacecraft state may in actuality be closer to the unsafe or avoidance region than estimated, thus guaranteeing that the chaser will remain outside the avoidance region to the a priori specified probability level.

Some aspects of the present disclosure include an approach that is applied to a mission which is staged into three phases. A first phase constrains the controller to maintain passive safety with respect to an approach ellipsoid (AE) around the target. A second phase is initiated once the command to enter the AE is issued, maintains passive safety with respect to a keep-out ellipsoid (KOE), often also called a keep-out sphere (KOS) if the dimensions are equal in all axes. Finally, a third phase is initiated once the final approach is engaged, wherein the spacecraft may enter the KOE, at which point passive safety is no longer enforced. According to one aspect of the present disclosure is that the controlled spacecraft is actuated by eight thrusters, each mounted in a manner aligned with the center of mass of the spacecraft so that they produce forces to change the position of the spacecraft while producing no torques to rotate the spacecraft. According to an aspect of the present disclosure, the objective is to rendezvous a controlled chaser spacecraft with an uncontrolled spacecraft or celestial body. In this disclosure, the spacecraft under control is also referred as a controlled spacecraft or chaser spacecraft to indicate the objective of control. Similarly, the uncontrolled spacecraft or celestial body or a region around the spacecraft or celestial body is also referred as a target, i.e., the body or region to be chased.

Features

An aspect can include the spacecraft states and the target states includes one or combination of positions, orientations, and translational and angular velocities of the spacecraft and the target, wherein the perturbations are natural orbital forces such as solar and lunar gravitational perturbations, anisotropic gravitational perturbations due to a central body's non-sphericity, solar radiation pressure, and air drag. Wherein an aspect is the celestial objects include a primary body such as Earth around which the target orbits, or a primary body such as Earth and a secondary body such as a Moon, so that the target is in a halo orbit, a periodic three-dimensional orbit near one of a L1 Lagrange point, L2 Lagrange points or L3 Lagrange points.

Another aspect is the processor is a guidance and control computer (GCC) in communication with the transceiver and the memory, such that the target orbit is determined from the accepted data, the data includes uploaded ephemeris from a ground station, ground data obtained in satellite tracking databases, or estimated from onboard sensor measurements on the spacecraft. Another aspect is the target is one of a spacecraft, a space station, a celestial body or orbital debris, and wherein a region around the target is one of an approach ellipsoid (AE) region or a keep-out sphere (KOS) region, and wherein a region around the target is one of an approach polytope (AP) region or a keep-out polytope (KOP) region. Such that an aspect is the target orbit is one of circular orbits, elliptic orbits, halo orbits, near rectilinear halo orbits or a quasi-satellite orbit.

An aspect is the spacecraft states and the target states in the multi-object celestial system includes one or combination of positions, orientations, and translational and angular velocities of the spacecraft and the target, and the perturbations acting on the multi-object celestial system, wherein the spacecraft and the target form the multi-object celestial system, wherein the perturbations acting on the multi-object celestial system are natural orbital forces such as solar and lunar gravitational perturbations, anisotropic gravitational perturbations due to a central body's non-sphericity, solar radiation pressure, and air drag.

Another aspect is the multi-object celestial system includes a celestial reference system or celestial coordinate system, that includes positions of the spacecraft, the target and other celestial objects such as other spacecrafts or orbital debris, in a three-dimensional space, or plot a direction on a celestial sphere, if an object's distance is unknown, wherein the celestial objects include a primary body such as Earth around which the target orbits, or a primary body such as Earth and a secondary body such as a Moon, so that the target is in a halo orbit, a periodic three-dimensional orbit near one of a L1 Lagrange point, L2 Lagrange points or L3 Lagrange points. Still another aspect is the processor is a guidance and control computer (GCC) in communication with the transceiver and the memory, such that the target orbit is determined based on uploaded ephemeris from a ground station, based on ground data obtained in satellite tracking databases, or estimated from onboard sensor measurements on the spacecraft obtained from the accepted data.

An aspect can be the target is one of a spacecraft, a space station, a celestial body or orbital debris, and wherein a region around the target is one of an approach ellipsoid (AE) region or a keep-out sphere (KOS) region, wherein a region around the target is one of an approach polytope (AP) region or a keep-out polytope (KOP) region, and wherein the target orbit is one of circular orbits, elliptic orbits, halo orbits, near rectilinear halo orbits or a quasi-satellite orbit. Another aspect is the set of avoidance regions and the set of drift regions are backwards reachable sets that are one of ellipsoids, polytopes or zonotopes, such that the computations of the backwards reachable sets of the desired target region around the target are performed, and in real time based on an estimated position of the target from onboard sensor measurements on the spacecraft and stored in memory. Wherein the desired target region is time-varying as the target moves along the target orbit such that the backwards reachable sets are computed for multiple target positions and desired target region positions along the target orbit.

Another aspect is the controller is a model predictive controller (MPC), such that the MPC uses a local convexification of the set of avoidance regions to formulate linear passive safety constraints that are only satisfied when a spacecraft state is not inside an avoidance region. Wherein the local convexification of the set of avoidance regions is achieved by computing a half space constraint that approximates an avoidance region boundary, such that the half space constraint is formulated as a chance constraint which requires that the half space constraint be satisfied with at least a priori specified probability level due to an uncertainty regarding a position of the spacecraft or the target, and/or an uncertainty of a thruster magnitude or a direction. Another aspect is the updated controller is subjected to the constraints by formulating an optimal control problem that includes the constraints so that when optimized over a set of admissible control inputs, an optimizer generates the control commands. Wherein an aspect is the control commands are generated for each specified time period of multiple specified time periods in the finite time horizon, or generated iteratively over a receding time-horizon. Wherein the control commands are generated iteratively, and wherein at least one iteration includes updating one or combination of the components of the cost function; and weights of the components of the cost function and constraints based on a change of a desired operation of the spacecraft. Wherein for each iteration at a next sequential specified time period, there are different sets of avoidance regions.

An aspect is the set of avoidance regions represents regions of space around the desired target region guaranteeing intersection trajectories with the desired target region, in an event of total or partial spacecraft thruster failure, and wherein the set of drift regions represents regions of space around the desired goal region that guarantee spacecraft thruster free operation to reach the desired goal region.

According to an embodiment of the present disclosure, a drift-based rendezvous control system for controlling an operation of a transportation device (i.e. boat, submarine, airplane, marine vessel, motorized or non-motorized boat or vessel, or any tanker, freighter, barge, or other watercraft which transports solid or liquid freight, including grain, coal, rock, petroleum liquid, or crude oil in bulk, hereafter "transportation device") to rendezvous the transportation device to a goal region over a finite time horizon. The drift-based rendezvous control system including a transceiver accepts data including values of transportation device states at a specified time period within the finite time horizon. A processor at the specified time period is to access a memory having a stored data including a goal region database. Select a set of drift regions corresponding to a desired goal region at a location on water such as a river, lake or ocean where the target is located at the specified time period. Wherein the set of drift regions represents regions of space around the desired goal region that guarantee thruster free operation to reach the desired goal region. Update a controller having a model of dynamics of the transportation device with the accepted data. Formulate the set of drift regions as a penalty in a cost function of the updated controller. Generate control commands that result in a real-time drift-based control policy where upon entering the drift region, the thrusters are turned off in order to minimize an amount of operation of the thrusters while rendezvousing with the desired goal region. Output the control commands to activate or not activate one or more thrusters of the transportation device for the specified time period based on the control commands. Wherein the thrusters can be a motor, machine to produces thrust or an energy producing system the produces thrust in order to move the transportation device in the water from a first location to a final location.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Space rendezvous: Space rendezvous can be a set of orbital maneuvers during which two spacecraft (or a chaser spacecraft and a target, (i.e. the target can be another spacecraft, space station, celestial body or orbital debris), arrive at the same orbit and approach to a very close distance (e.g. within visual contact).

Natural Drift: The natural drift in space causes spacecraft motion because the spacecraft is a physical mass, and the spacecraft has its own gravitation. That's how the spacecraft can tug on a planetary orbit and actually decrease the planet's orbital momentum by a tiny amount. In the exchange, the spacecraft acquires momentum from the planetary orbit gravitational forces. i.e. natural drift. A planet's own motion is key, for example, a stationary planet such as the sun sits on a stationary platform, whereas with the planet Jupiter is a planet with enormous angular momentum as the planet revolves around the Sun. A simplified review of Jupiter's motion along its solar orbit is that the planet revolves along an arc, not a straight line. Wherein the spacecraft mass acquires a Sun-relative directional gravitational force, or a significant portion of the force, during the spacecraft's interaction with Jupiter, thus the gravitational forces place the spacecraft in motion with the spacecraft thrusters turned off.

Propellants: Most rockets today operate with either solid or liquid propellants. The word propellant does not mean simply fuel, as you might think; it means both fuel and oxidizer. The fuel is the chemical rockets burn, but for burning to take place, an oxidizer (oxygen) must be present. Jet engines draw oxygen into their engines from the surrounding air. Rockets do not have the luxury that jet planes have; they must carry oxygen with them into space, where there is no air. A rocket in its simplest form is a chamber enclosing a gas under pressure. A small opening at one end of the chamber allows the gas to escape, and in doing so provides a thrust that propels the rocket in the opposite direction. A good example of this is a balloon. Air inside a balloon is compressed by the balloon's rubber walls. The air pushes back so that the forces on each side are balanced. When the nozzle is released, air escapes through it and the balloon is propelled in the opposite direction. With space rockets, the gas is produced by burning propellants that can be solid or liquid in form or a combination of the two.

Solid Rocket Propellants, which are dry to the touch, contain both the fuel and oxidizer combined together in the chemical itself. Usually the fuel is a mixture of hydrogen compounds and carbon and the oxidizer is made up of oxygen compounds. Liquid propellants, which are often gases that have been chilled until they condense into liquids, are kept in separate containers: one for the fuel and the other for the oxidizer. Then, when the engine fires, the fuel and oxidizer are mixed together in the engine.

Liquid Rocket Propellants. This is a much more complicated engine, for they require sophisticated valves and pumps to handle the flow of fuel. They also require special mixing chambers and propellant feed lines. Liquid propellants, which are often gases that have been chilled until they condense into liquids, are kept in separate containers: one for the fuel and the other for the oxidizer. Then, when the engine fires, the fuel and oxidizer are mixed together in the engine. The fuel of a liquid-propellant rocket is usually kerosene or liquid hydrogen; the oxidizer is usually liquid oxygen. They are combined inside a cavity called the combustion chamber. Here the propellants burn and build up high temperatures and pressures, and the expanding gas escapes through the nozzle at the lower end. To get the most power from the propellants, they must be mixed as completely as possible. Small injectors (nozzles) on the roof of the chamber spray and mix the propellants at the same time. Because the chamber operates under high pressures, the propellants need to be forced inside. Powerful, lightweight turbine pumps between the propellant tanks and combustion chambers take care of this job. With any rocket, and especially with liquid-propellant rockets, weight is an important factor. In general, the heavier the rocket, the more the thrust needed to get it off the ground. Because of the pumps and fuel lines, liquid engines are much heavier than solid engines.

Hybrid rockets: combine elements from both types of rockets. In a hybrid rocket, a gaseous or liquid oxidizer is stored in a tank separate from a solid fuel grain. The major benefit of solid rockets over hybrid rockets (and liquid systems, too) is their simplicity. In hybrid systems, then, it seems that higher complexity is the price paid for better performance. However, note that the performance for these rockets is rival to that of liquid systems. Furthermore, note that hybrid rocket systems require support for only one fluid system, including tanks, valves, regulators, etc. In other words, although hybrid rockets are more complex than solid systems, they compare in performance to liquid systems while requiring only half of the plumbing. This vastly reduces the overall systems weight and cost, while increasing its reliability (there will be fewer parts which could fail). Hybrid rocket systems are also safer to produce and store, can be more ecologically safe with proper propellant choice, and the fuel grain, being inert, is stronger than manufactured solid propellant grains (for solid rockets), and is therefore more reliable.

Newton's First Law: Newton's first law can be stated as: "An object at rest tends to stay at rest and an object in motion tends to stay in motion unless acted upon by an unbalanced force". In other words, everybody continues in a state of rest, or of uniform motion in a straight line, unless it is compelled to change that state by forces impressed upon it. If an object, such as a rocket, is at rest then the forces on it are balanced. It takes an additional force to unbalance the forces and make the object move. If the object is already moving, it takes such an unbalanced force, to stop it, change its direction from a straight-line path, or alter its speed. In rocket flight, forces become balanced and unbalanced all the time.

Newton's Second Law: Can be express as the change of motion (linear momentum) is proportional to the force impressed and is made in the direction of the straight line in which that force is impressed. This law of motion is essentially a statement of a mathematical equation. The three parts of the equation are mass (m), acceleration (a), and force (f). Using letters to symbolize each part, the equation can be written as follows: $F=ma$. When applying this principle to a rocket. The pressure created by the controlled explosion taking place inside the rocket's engines is a force called thrust. That pressure accelerates the gas one way and the rocket the other. The thrust for the rocket continues over the force of gravity as long as the rockets engines are firing. Because propellant is burned up, the mass of the rocket changes during flight. Its mass is the sum of all its parts. Rocket parts includes engines, payload, control system, propellant tanks, and propellants. By far, the largest part of the rocket's mass is its propellants. But this mass constantly changes as the engines fire since the engines expel the used fuel in the exhaust plume. Thus the rocket's mass is slowly becoming smaller during flight. In order for the left side of our equation to remain in balance with the right side, acceleration of the rocket has to increase as its mass decreases. That is why a rocket starts off moving slowly and goes faster and faster as it climbs into space. Newton's second law of motion can be restated in the following way: the greater the mass of rocket fuel burned, and the faster the gas produced can escape the engine, the greater the upward thrust of the rocket.

Newton's Third Law: To every action there is always an equal and opposite reaction; or, the mutual actions of two bodies upon each other are always equal, and act in opposite directions, i.e. "every action has an equal and opposite reaction". If you have ever stepped off a small boat that has not been properly tied to a pier, you will know exactly what this law means. The boat goes forward, you go backward! A rocket can lift off from a launch pad only when it expels gas out of its engine. The rocket pushes on the gas, and the gas in turn pushes on the rocket. With rockets, the action is the expelling of gas out of the engine. The reaction is the movement of the rocket in the opposite direction. To enable a rocket to lift off from the launch pad, the action, or thrust, from the engine must be greater than the mass of the rocket. In space, however, even tiny thrusts will cause the rocket to change direction.

Putting Newton's Three Laws of Motion Together: An unbalanced force must be exerted for a rocket to lift off from a launch pad or for a craft in space to change speed or direction (first law). The amount of thrust (force) produced by a rocket engine will be determined by the mass of rocket fuel that is burned and how fast the gas escapes the rocket (second law). The reaction, or motion, of the rocket is equal to and in the opposite direction of the action, or thrust, from the engine (third law). There are three ways to modify the momentum of a body. The mass can be changed, the velocity can be changed (acceleration), or both.

Celestial System (Celestial Reference System): In astronomy, a celestial coordinate system (or celestial reference system) is a system for specifying positions of satellites, planets, stars, galaxies, and other celestial objects relative to physical reference points available to a situated observer (e.g. the true horizon and north cardinal direction to an observer situated on the Earth's surface). Coordinate systems can specify an object's position in three-dimensional space or plot merely its direction on a celestial sphere, if the object's distance is unknown or trivial. The coordinate systems are implemented in either spherical or rectangular coordinates. Spherical coordinates, projected on the celestial sphere, are analogous to the geographic coordinate system used on the surface of Earth. These differ in their choice of fundamental plane, which divides the celestial sphere into two equal hemispheres along a great circle. Rectangular coordinates, in appropriate units, are simply the cartesian equivalent of the spherical coordinates, with the same fundamental (x, y) plane and primary (x-axis) direction. Each coordinate system is named after its choice of fundamental plane.

FIG. 7A, FIG. 7B, FIG. 7C, FIG. 7D and FIG. 7E are schematic diagrams illustrating of some conventional parameters to better understand aspects used for implementing some aspects of the methods and systems, according to some embodiments of the present disclosure.

Figures 7A, 7B:
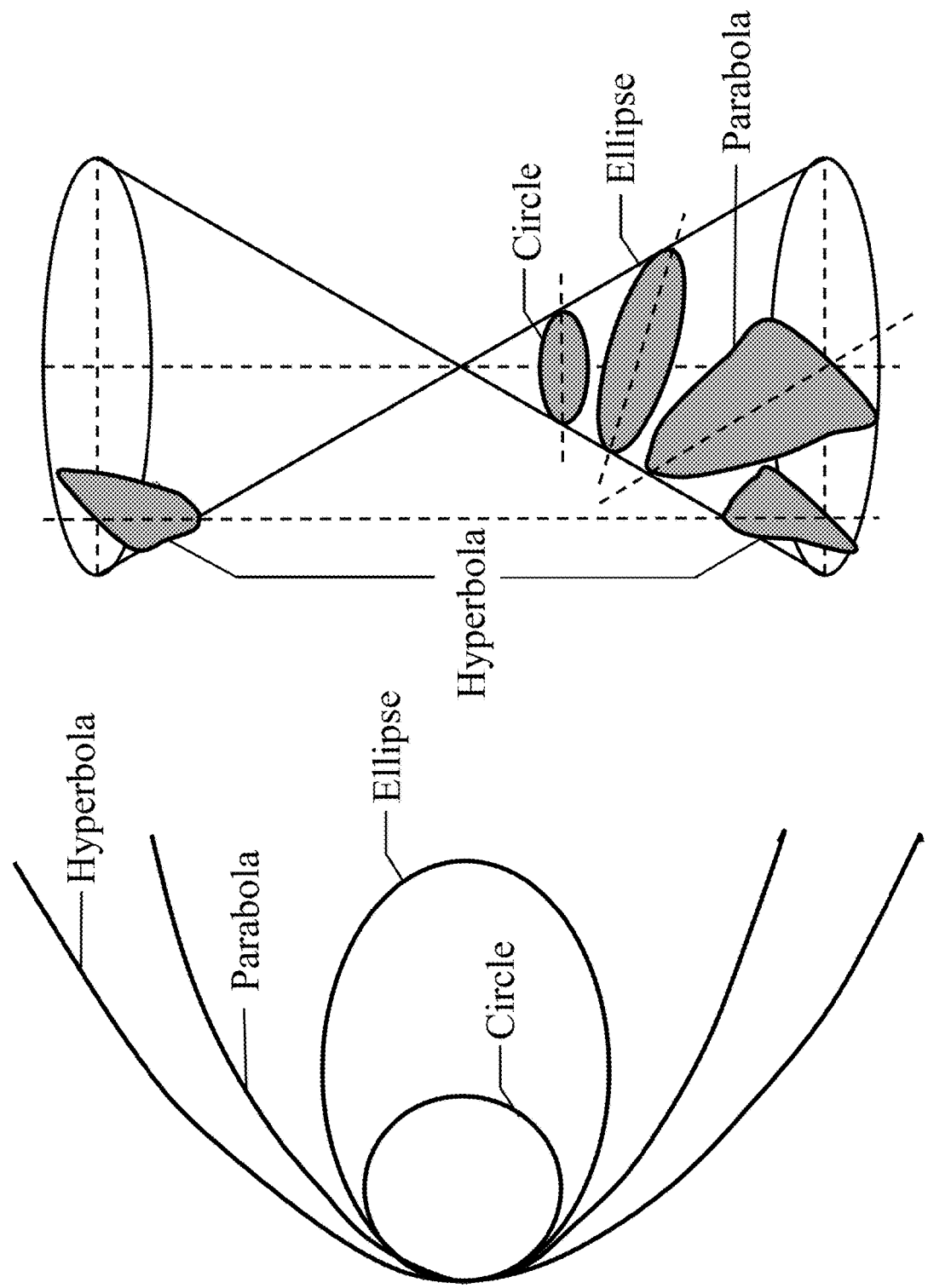
FIG. 7A, FIG. 7B, FIG. 7C, FIG. 7D and FIG. 7E are schematic diagrams of some conventional parameters to better understand aspects used for implementing some aspects of the methods and systems, according to some embodiments of the present disclosure.

Conic Sections: Referring to the FIG. 7A and FIG. 7B, a conic section, or just conic, is a curve formed by passing a plane through a right circular cone. FIG. 7A and FIG. 7B show an angular orientation of a plane relative to the cone that determines whether the conic section is a circle, ellipse, parabola, or hyperbola. The circle and the ellipse arise when the intersection of cone and plane is a bounded curve. The circle is a special case of the ellipse in which the plane is perpendicular to the axis of the cone. If the plane is parallel to a generator line of the cone, the conic is called a parabola. Finally, if the intersection is an unbounded curve and the plane is not parallel to a generator line of the cone, the figure is a hyperbola. In the latter case, the plane will intersect both halves of the cone, producing two separate curves. All conic sections can be defined in terms of the eccentricity. The type of conic section is also related to the semi-major axis and the energy. The table below shows the relationships between eccentricity, semi-major axis, and energy and the type of conic section. For example, conic section for the circle can have an eccentricity, e of 0, a semi-major axis=the radius, and the energy is <0;

conic section for the ellipse can have an eccentricity, e of 0<e<1, a semi-major axis=>0, and the energy is <0;

conic section for the parabola can have an eccentricity, e of 1, a semi-major axis of infinity, and the energy is 0; and conic section for the hyperbola can have an eccentricity, e of >1, a semi-major axis <0, and the energy is >0.

Satellite orbits can be any of the four conic sections. This page deals mostly with elliptical orbits, though we conclude with an examination of the hyperbolic orbit.

Figure 7D:
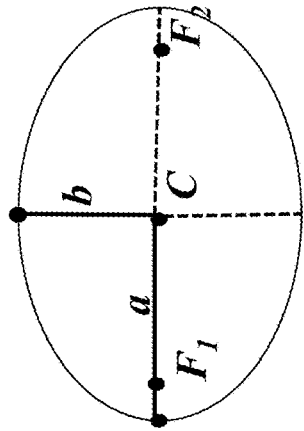
Figure 7C:
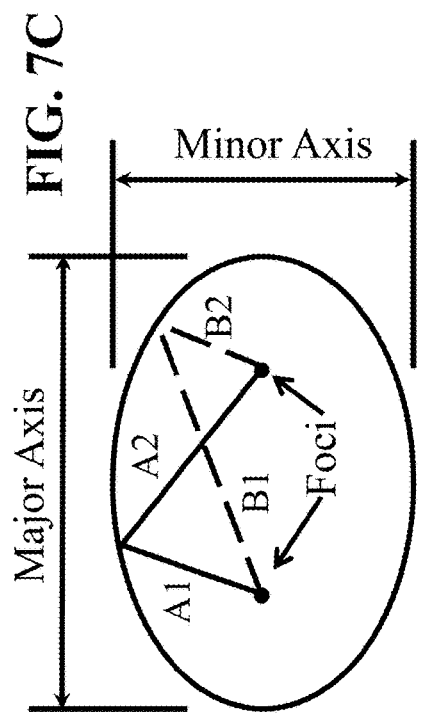
Figure 7E:
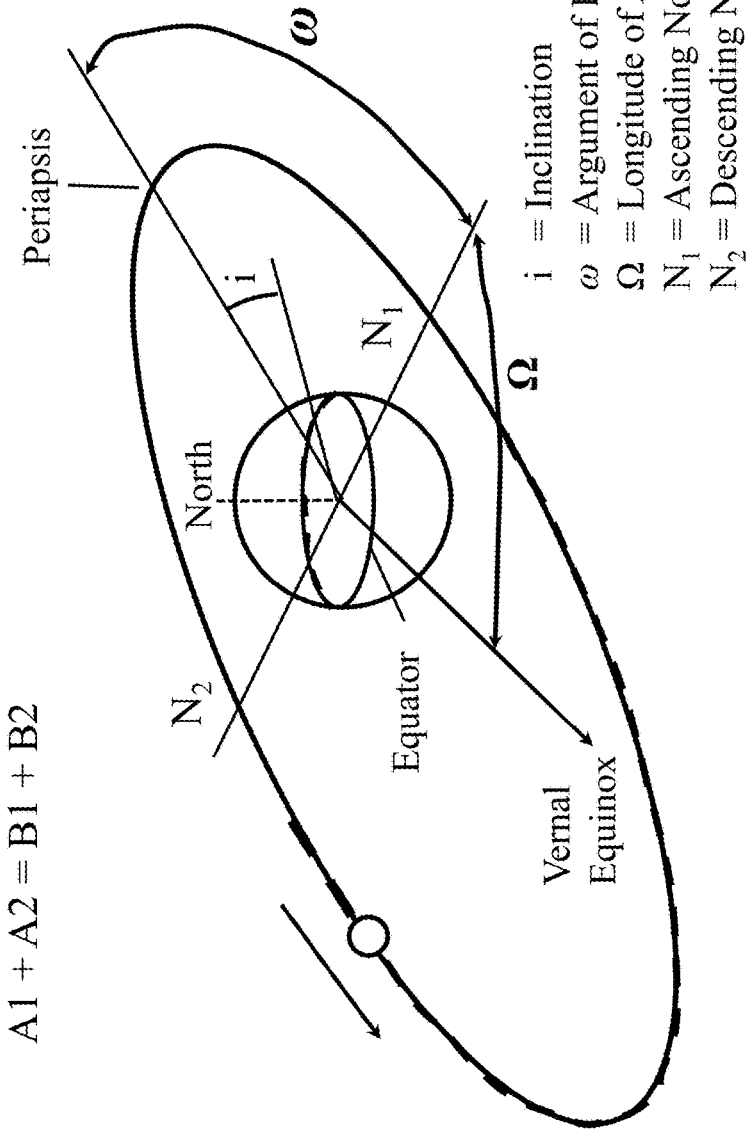

Referring to the FIG. 7C, FIG. 7D and FIG. 7E, to mathematically describe a conventional orbit one must define six quantities, called orbital elements. They are: Semi-Major Axis, a; Eccentricity, e; Inclination, I; Argument of Periapsis, w; Time of Periapsis Passage, T; and Longitude of Ascending Node, FIG. 7C to FIG. 7E show a conventional orbiting satellite that follows an oval shaped path known as an ellipse with the body being orbited, called the primary, located at one of two points called foci. FIG. 7C shows an ellipse defined to be a curve with the following property: for each point on an ellipse, the sum of its distances from two fixed points, called foci, is constant. The longest and shortest lines that can be drawn through the center of an ellipse are called the major axis and minor axis, respectively. The semi-major axis is one-half of the major axis and represents a satellite's mean distance from its primary. Eccentricity is the distance between the foci divided by the length of the major axis and is a number between zero and one. An eccentricity of zero indicates a circle.

FIG. 7E shows inclination i that is the angular distance between a satellite's orbital plane and the equator of its primary (or the ecliptic plane in the case of heliocentric, or sun centered, orbits). An inclination i of zero degrees indicates an orbit about the primary's equator in the same direction as the primary's rotation, a direction called prograde (or direct). An inclination i of 90 degrees indicates a polar orbit. An inclination i of 180 degrees indicates a retrograde equatorial orbit. A retrograde orbit is one in which a satellite moves in a direction opposite to the rotation of its primary.

Still referring to FIG. 7E, periapsis w is the point in an orbit closest to the primary (i.e. for an object moving in an elliptical orbit about another celestial body, the point of closest approach is the periapsis, and at this point in the orbit, the object is travelling at its greatest speed via Kepler's Second Law). The opposite of periapsis w, the farthest point in an orbit, is called apoapsis (i.e. an object moving in an elliptical orbit about another celestial body, the point of greatest separation is the apoapsis, at this point in the orbit, the object is travelling at its slowest speed via Kepler's Second Law). A perihelion is a position of closest approach, i.e. the shortest distance between the Sun and the planet, at this point in the orbit, the planet is moving at its maximum speed via Kepler's Second Law. An aphelion is a greatest distance between the Sun and the planet, at this point in the orbit, the planet is moving at its slowest speed via Kepler's Second Law, such that the aphelion refers specifically to orbits around the Sun, and is equivalent to the apoapsis of a general orbit. Wherein, the periapsis co and apoapsis are usually modified to apply to the body being orbited, such as perihelion and aphelion for the Sun, perigee and apogee for Earth, perijove and apojove for Jupiter, perilune and apolune for the Moon, etc. The argument of periapsis ω is the angular distance between the ascending node $N_1$ and the point of periapsis. The time of periapsis passage T is the time in which a satellite moves through its point of periapsis.

Periapsis: The point of a body's elliptical orbit about the system's center of mass where the distance between the body and the center of mass is at its minimum. Wherein, the argument of periapsis (also called argument of perifocus or argument of pericenter), symbolized as ω, is one of the orbital elements of an orbiting body. Parametrically, ω is the angle from the body's ascending node to its periapsis, measured in the direction of motion. For specific types of orbits, words including perihelion (for heliocentric orbits), perigee (for geocentric orbits), Periastron (for orbits around stars), and so on may replace the word periapsis. (See apsis for more information.) An argument of periapsis of 0° means that the orbiting body will be at its closest approach to the central body at the same moment that it crosses the plane of reference from South to North. An argument of periapsis of 90° means that the orbiting body will reach periapsis at its north most distance from the plane of reference. Adding the argument of periapsis to the longitude of the ascending node gives the longitude of the periapsis. However, especially in discussions of binary stars and exoplanets, the terms "longitude of periapsis" or "longitude of periastron" are often used synonymously with "argument of periapsis". Apoapsis: The point of a body's elliptical orbit about the system's centre of mass where the distance between the body and the centre of mass is at its maximum.

Nodes: are the points where an orbit crosses a plane, such as a satellite crossing the Earth's equatorial plane. If the satellite crosses the plane going from south to north, the node is the ascending node $N_1$; if moving from north to south, it is the descending node $N_2$. The longitude of the ascending node $N_1$ is the node's celestial longitude. Celestial longitude is analogous to longitude on Earth and is measured in degrees counter-clockwise from zero with zero longitude being in the direction of the vernal equinox Ω.

Types of orbits: Geosynchronous orbits (GEO): are circular orbits around the Earth having a period of 24 hours. A geosynchronous orbit with an inclination of zero degrees is called a geostationary orbit. A spacecraft in a geostationary orbit appears to hang motionless above one position on the Earth's equator. For this reason, they are ideal for some types of communication and meteorological satellites. A spacecraft in an inclined geosynchronous orbit will appear to follow a regular figure-8 pattern in the sky once every orbit. To attain geosynchronous orbit, a spacecraft is first launched into an elliptical orbit with an apogee of 35,786 km (22,236 miles) called a geosynchronous transfer orbit (GTO). The orbit is then circularized by firing the spacecraft's engine at apogee. Polar orbits (PO): are orbits with an inclination of 90 degrees. Polar orbits are useful for satellites that carry out mapping and/or surveillance operations because as the planet rotates the spacecraft has access to virtually every point on the planet's surface. Walking orbits: An orbiting satellite is subjected to a great many gravitational influences. First, planets are not perfectly spherical and they have slightly uneven mass distribution. These fluctuations have an effect on a spacecraft's trajectory. In addition, the sun, moon, and planets contribute a gravitational influence on an orbiting satellite. With proper planning, it is possible to design an orbit, which takes advantage of these influences to induce a precession in the satellite's orbital plane. The resulting orbit is called a walking orbit. Sun synchronous orbits (SSO): are walking orbits whose orbital plane precesses with the same period as the planet's solar orbit period. In such an orbit, a satellite crosses periapsis at about the same local time every orbit. This is useful if a satellite is carrying instruments, which depend on a certain angle of solar illumination on the planet's surface. In order to maintain an exact synchronous timing, it may be necessary to conduct occasional propulsive maneuvers to adjust the orbit. Molniya orbits: are highly eccentric Earth orbits with periods of approximately 12 hours (2 revolutions per day). The orbital inclination is chosen so the rate of change of perigee is zero, thus both apogee and perigee can be maintained over fixed latitudes. This condition occurs at inclinations of 63.4 degrees and 116.6 degrees. For these orbits, the argument of perigee is typically placed in the southern hemisphere, so the satellite remains above the northern hemisphere near apogee for approximately 11 hours per orbit. This orientation can provide good ground coverage at high northern latitudes. Hohmann transfer orbits: are interplanetary trajectories whose advantage is that they consume the least possible amount of propellant. A Hohmann transfer orbit to an outer planet, such as Mars, is achieved by launching a spacecraft and accelerating it in the direction of Earth's revolution around the sun until it breaks free of the Earth's gravity and reaches a velocity, which places it in a sun orbit with an aphelion equal to the orbit of the outer planet. Upon reaching its destination, the spacecraft must decelerate so that the planet's gravity can capture it into a planetary orbit. For example, to send a spacecraft to an inner planet, such as Venus, the spacecraft is launched and accelerated in the direction opposite of Earth's revolution around the sun (i.e. decelerated) until it achieves a sun orbit with a perihelion equal to the orbit of the inner planet. It should be noted that the spacecraft continues to move in the same direction as Earth, only more slowly. To reach a planet requires that the spacecraft be inserted into an interplanetary trajectory at the correct time so that the spacecraft arrives at the planet's orbit when the planet will be at the point where the spacecraft will intercept it. This task is comparable to a quarterback "leading" his receiver so that the football and receiver arrive at the same point at the same time. The interval of time in which a spacecraft must be launched in order to complete its mission is called a launch window. Near-rectilinear halo orbits (NRHOs): can be defined as "almost stable" orbits where stability is measured using stability indexes v.

CR3BP model: Near rectilinear halo orbits are members of the broader set of L1 and L2 families of halo orbits, that is, foundational structures that exist in the dynamical environment modeled in terms of multiple gravitational bodies. L1 is a point 1/100 of the way from Earth to the sun, or the first Lagrangian point, where centripetal force and the gravitational pulls of Earth and sun all cancel out. It is one of five such points in the Earth-sun system where a space probe could in principle sit forever as though balanced on the gravitational version of the head of a pin. Another one, L2, is on the far side of Earth from the sun, 1.6 million kilometers out. Both L1 and L2 are ideal venues from which to look out toward the universe, and L1 is a good vantage on Earth and the sun, as well. However, they have drawbacks: At L1, a spacecraft's signal would be overwhelmed by the radiation from the sun behind it. At L2, Earth's shadow blocks the solar radiation a probe needs to power its instruments. The solution is to put spacecraft into "halo orbits" around the Lagrangian points. A spacecraft in a halo orbit around L1 describes huge, lazy loops perpendicular to the Earth-sun axis, endlessly falling toward the balance point. The fundamental behavior also persists in a higher-fidelity model and, thus, supports potential long-term mission scenarios for spacecraft, possibly crewed, in orbits near the Moon. This type of trajectory is first identified in a simplified representation of the gravitational effects in the Earth-Moon system, i.e., the Circular Restricted Three Body Problem (CR3BP). In the CR3BP model, Near-rectilinear halo orbits (NRHOs), i.e. can be defined as "almost stable" orbits where stability is measured using stability indexes v, are characterized by favorable stability properties that suggest the potential to maintain NRHO-like motion over a long duration while consuming few propellant resources. Some NRHOs also possess favorable resonance properties that can be exploited for mission design and are particularly useful to avoid eclipses. For actual mission implementations, however, transfers into such orbits, as well as station keeping strategies, must be demonstrated in a higher-fidelity ephemeris model. Station keeping algorithms for libration point orbits have previously been explored within this dynamical regime in the context of both planar Lyapunov and classical three-dimensional halo orbits. However, NRHOs as constructed in the ephemeris regime.

Perturbation: can be a complex motion of a massive body subject to forces other than the gravitational attraction of a single other massive body. The other forces can include a third (fourth, fifth, etc.) body, resistance, as from an atmosphere, and the off-center attraction of an oblate or otherwise misshapen body. The perturbing forces of the Sun on the Moon at two places in its orbit. The dark dotted arrows represent the direction and magnitude of the gravitational force on the Earth. Applying this to both the Earth's and the Moon's position does not disturb the positions relative to each other. When it is subtracted from the force on the Moon (dark solid arrow), what is left is the perturbing force (dark double arrows) on the Moon relative to the Earth. Because the perturbing force is different in direction and magnitude on opposite sides of the orbit, it produces a change in the shape of the orbit.

Figure 8A:
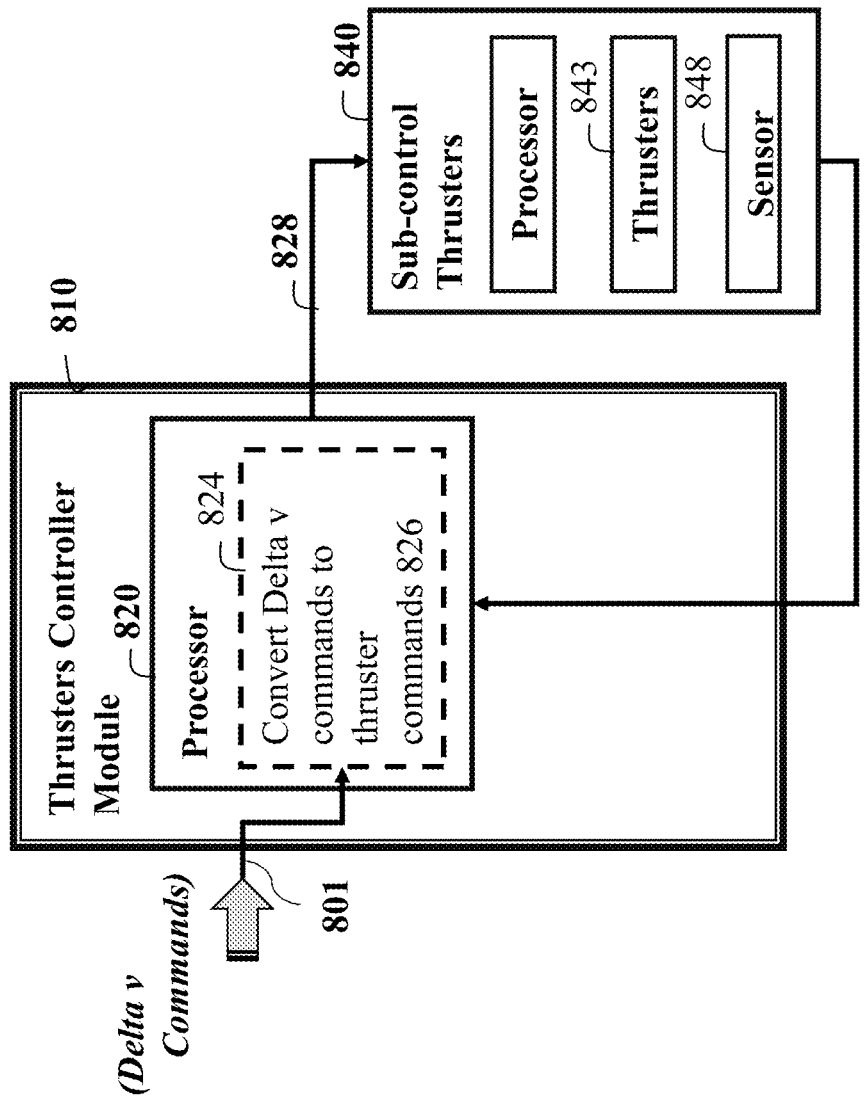
FIG. 8A is a block diagram illustrating some components for implementing the generated control commands, according to an embodiment of the present disclosure.

FIG. 8A is a block diagram illustrating some components for implementing the generated transfer orbit, according to an embodiment of the present disclosure. A thruster controller module 810 can include a processor 820 that can convert 824 the received delta v commands 801 to thruster commands 826 that can be sent via bus 828 to the thrusters 843 of the sub-control thruster 840, that can be connected to sensors 848.

Figure 8B:
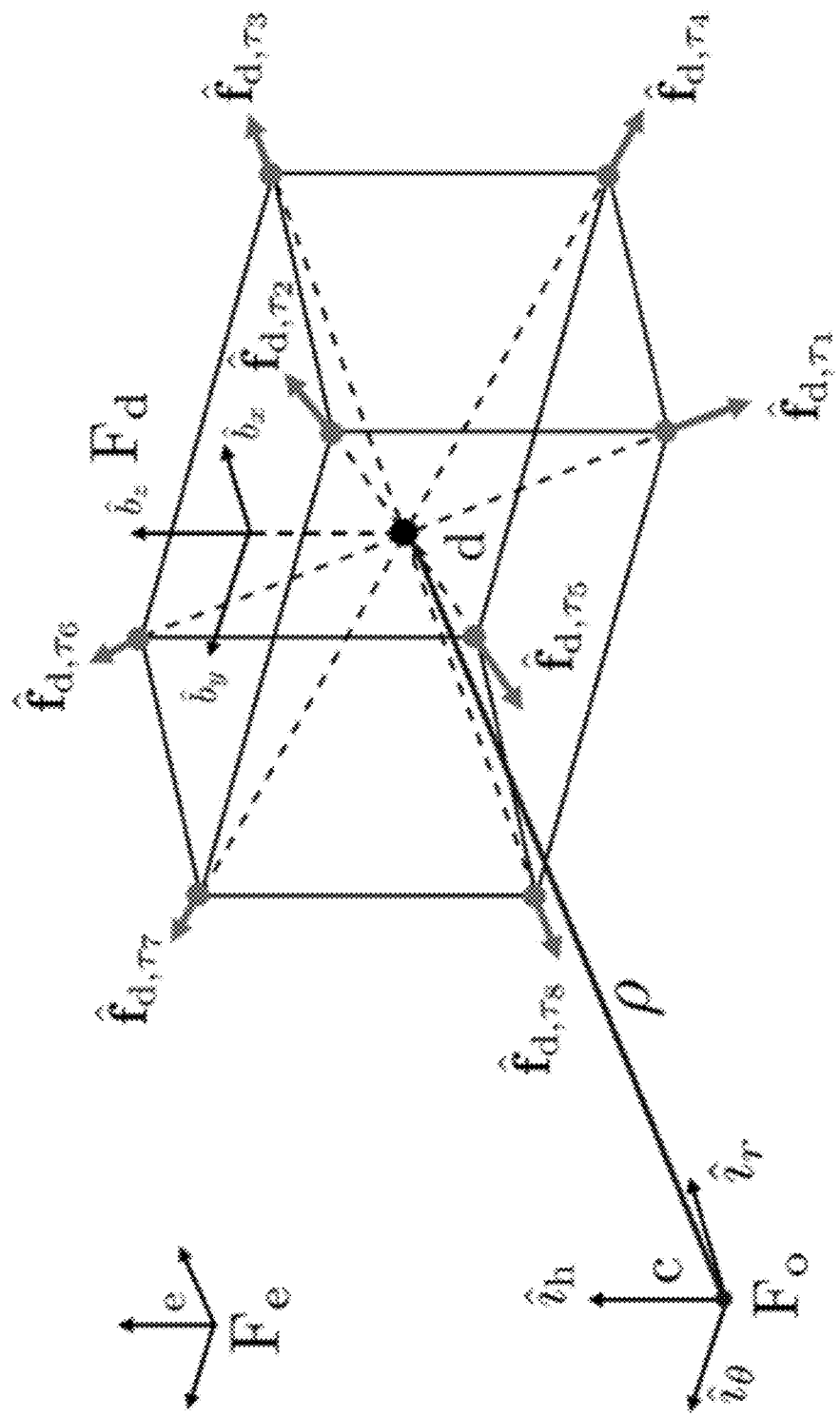
FIG. 8B is a schematic diagram illustrating aspects of a thruster configuration, according to an embodiment of the present disclosure.

FIG. 8B is a schematic diagram illustrating aspects of a thruster configuration, according to an embodiment of the present disclosure. For example, the spacecraft may be equipped with eight thrusters that are mounted at the corners of the spacecraft so that they aligned and produce pure forces that act on the center of mass of the spacecraft without producing any torques that would rotate the spacecraft. The controller will send signals to activate or deactivate the thrusters in order to move the spacecraft along a commanded trajectory.

Figure 8C:
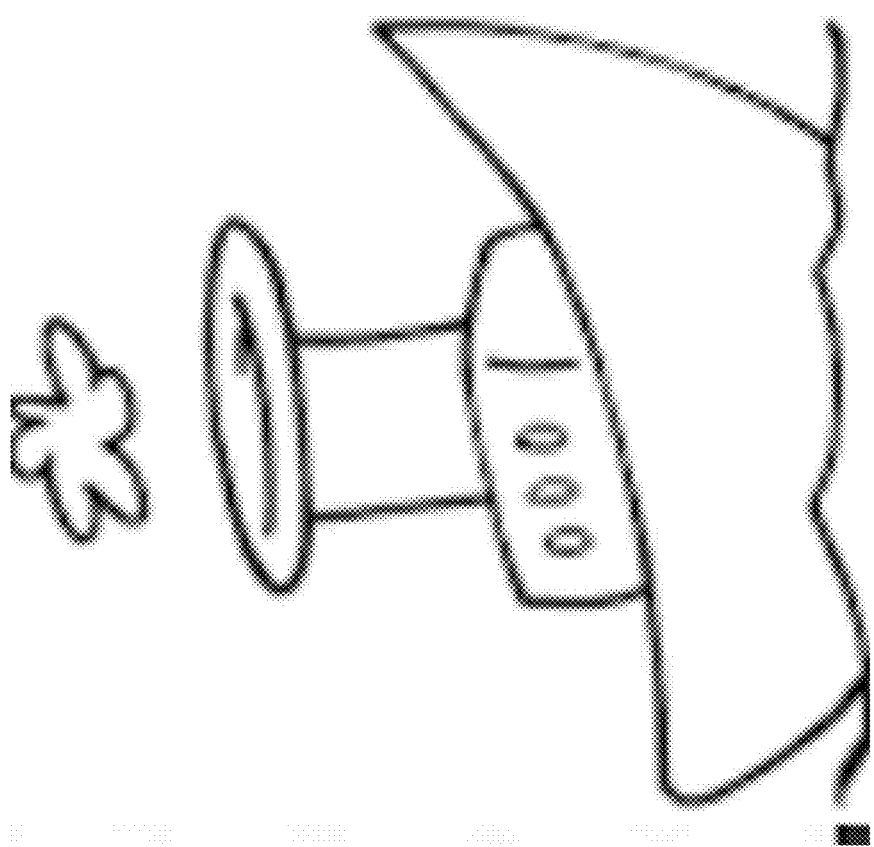
FIG. 8C is a schematic diagram illustrating a motor boat, according to an embodiment of the present disclosure.

FIG. 8C is a schematic diagram illustrating a motor boat, according to an embodiment of the present disclosure. For example, a controller to control a boat to rendezvous the boat with a target in real time over a finite time horizon, wherein the boat and the target form a multi-object coordination system, and transceiver accepts data in real time including values of boat states and target states in the multi-object celestial system, at a specified time period within the finite time horizon, the controller comprising: a guidance and control computer (GCC) processor having an interface to pass information in real time related to a propulsion control system of the boat, the GCC processor at the specified time period is configured to identify an area the target is located in real time from the accepted data; access a memory having unsafe regions, and select a set of unsafe regions corresponding to the target area location from the stored unsafe regions, wherein the set of unsafe regions represents regions within the area around the target in which any operation of the predetermined combination of the number of operational motors does not avoid collision with the target, guaranteeing collision trajectories with the target; formulate the set of unsafe regions as safety constraints; update a controller having a model of dynamics of the boat with the accepted data; generate control commands by subjecting the updated controller to the safety constraints to produce a rendezvous trajectory that avoids the set of unsafe regions, guaranteeing an operation of at least the predetermined combination of the number of operational motors, in the event of partial propulsion control failure resulting in a trajectory that does not collide with the target; and output the control commands to the propulsion control system to activate or not activate one or more motors of the boat for the specified time period based on the control commands.

Figure 9:
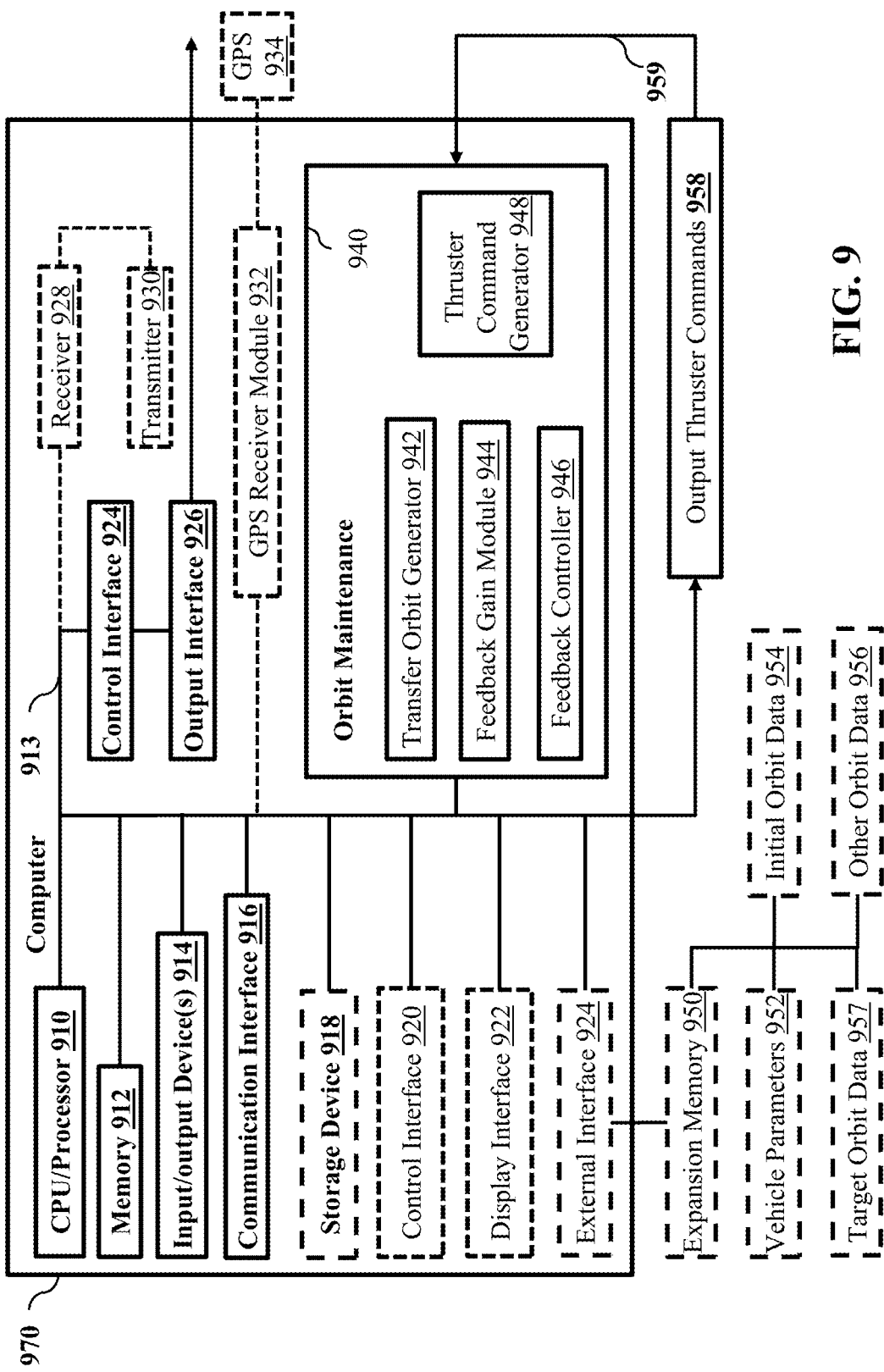
FIG. 9 is a schematic diagram illustrating some components used for implementing the methods and systems, according to some embodiments of the present disclosure.

FIG. 9 is a block diagram illustrating some components that can be used for implementing the systems and methods, according to some embodiments of the present disclosure. For example, a computer system 970 or network can be adapted for use in determining a transfer orbit for moving a spacecraft or vehicle from an initial orbit about a celestial body (e.g., the Mars or the like) into a target orbit about the celestial body or another celestial body. A CPU or processor(s) 910 can be connected via a bus system 913 to a memory 912, input/output devices 914 and a communication interface 916. Also connected to the bus system 913 can be a storage device 918, a control interface 920, display interface 922, and an external interface 924. The external interface 924 can be connected to an expansion memory 950, vehicle parameters 952 (i.e. spacecraft specifications, thruster specifications, size, weight, etc.), initial orbit data 954 (i.e. time, date, parameters including altitude, inclination, eccentricity, etc.) and other orbit data 956 (i.e. unique orbit data). The bus system 913 can also connect a control interface 924, output interface 926, receiver 928 and transmitter 930. Further, the bus system can connect a GPS receiver module 932 to a GPS 934.

The bus system 913 can connect an output thruster command module 958 to output the thruster commands. Wherein bus 959 connect back to an Orbit Maintenance 940 to communicate data from a thrusters Controller Module (not shown, see FIG. 8A). The Orbit Maintenance 940 comprises a Transfer Orbit Generator 942, a Feedback Gain Module 944, a Feedback Controller 946, and a Thruster Command Generator 948.

Still referring to FIG. 9, the computer 970 can be a server or a desktop, a laptop, a mobile or other computer device or system with one or more processors 910. The processor 910 may be a central processing unit adapted for accessing code in the form of a transfer orbit generator 942 in a memory 912 or storage data 918 of the computer 970 (or in an expansion memory 950 or other data storage 952, 954, 956. Contemplated are external storage devices if further required depending upon the specific design and aspect of an intended hardware and goal implementation, according aspects related to systems and methods of the present disclosure. For example, the computer 970 can be used to implement the steps of the systems and methods, where the memory 912, and/or storage device 918 can store data.

The stored data in the memory 912 of FIG. 9 can include the executable modules, vehicle data and historical space data. For example, the vehicle data can include specifications of the spacecraft, dimensions, weight, performance data under varied conditions including gravitation forces, and other perturbations, i.e. complex motion(s) of a massive body subject to forces other than the gravitational attraction of a single other massive body in space. Further, the vehicle data can include data related to aspects related to vehicle dynamics associated with one or more of the multi-variables, i.e. (1) unusual orbital characteristics of a celestial body, i.e. a natural object which is located outside of Earth's atmosphere, such as the Moon, the Sun, an asteroid, planet, or star; (2) unusual orbital motion the celestial body; (3) celestial body's unusually close orbit around another celestial body; and (4) other known perturbations. The space data can include data related to celestial body(s) system, past missions to celestial body(s) and any other data related to space, the spacecraft and planning orbital designs to other celestial bodies in the universe. For example, stored as space data can include data about the moons of celestial body(s), such as characteristics of celestial body(s) that can be taken into consideration in developing orbital designs from an initial celestial body(s) orbit to a similar target celestial body(s) orbit.

Optionally, the stored data can be stored in the storage device 918, the external interface 924, that is connected to an expansion memory 950 that connects to an initial orbit data database 954, other orbit data database 956, vehicle parameters, specifications, performance, etc. data database 952, and target orbit data database 957 of FIG. 9.

Still referring to FIG. 9, the processor 910 of the computer 970 may be two or more processors depending upon the specific application. For example, some steps may require a separate processor to ensure a specific processing time or processing speed associated with the systems and methods of the present disclosure. The receiver 928 or input interface can receive space data that may be up-to-date space data, obtained from either an Earth Mission Control Center or sensors associated with the spacecraft, or some other location, after the stored historical space data stored in the memory 912. The receiver 928 and transmitter 930 can provide a wireless venue for receiving and sending data to, for example, to an Earth Mission Control Center, or some other destination. A GPS receiver module 932 connected to a GPS 934 can be used for navigation related aspects. The computer 970 can include a control interface 920, display interface 922, and optionally external devices, control interfaces, displays, sensors, machines, etc., (not shown, see FIG. 9), that are contemplated for uses related to the systems and methods of the present disclosure.

Figure 10:
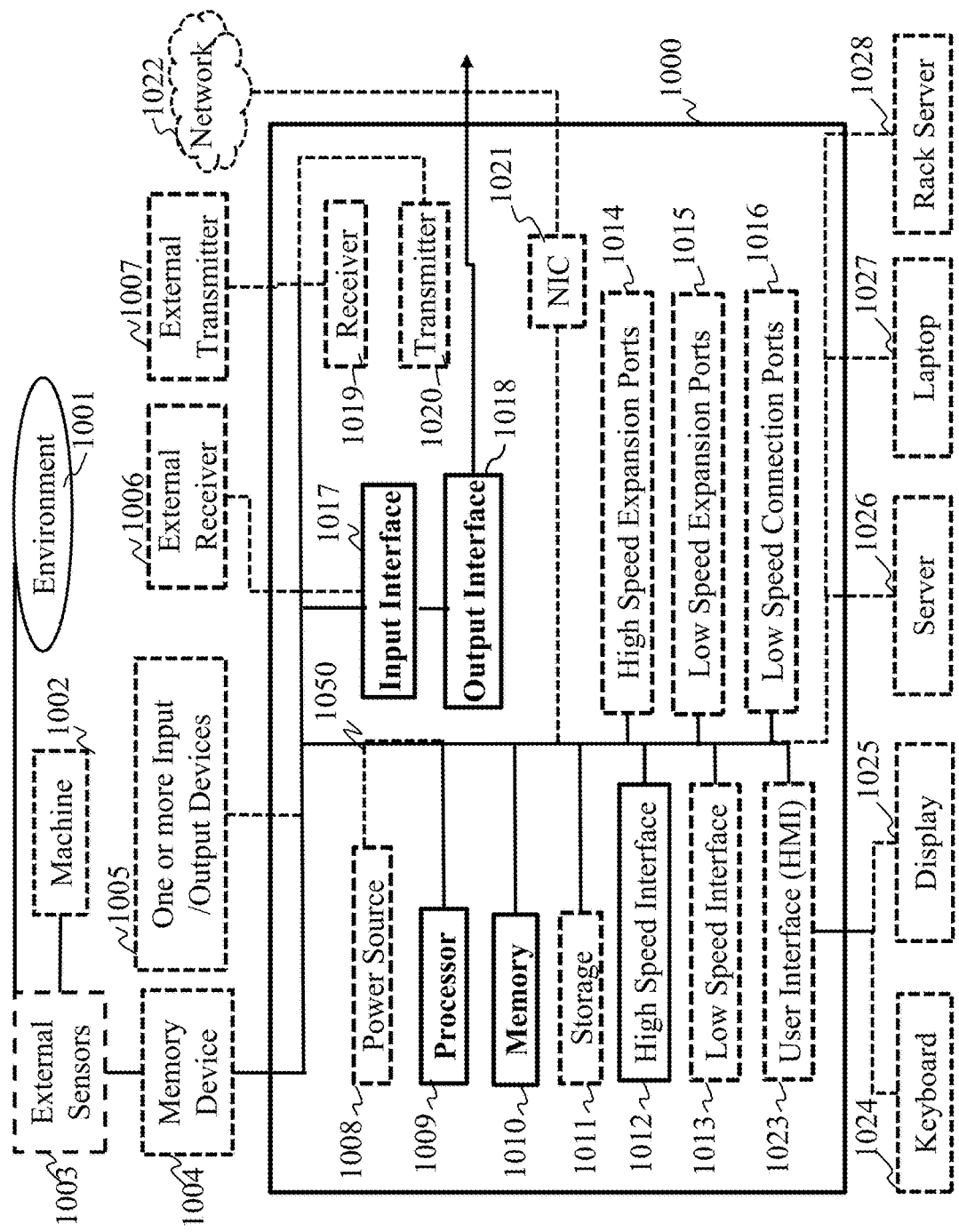
FIG. 10 is a schematic illustrating by non-limiting example a computing apparatus that can be used to implement some techniques of the methods and systems, according to embodiments of the present disclosure.

FIG. 10 is a schematic illustrating by non-limiting example a computing apparatus 1000 that can be used to implement some techniques of the methods and systems, according to embodiments of the present disclosure. The computing apparatus or device 1000 represents various forms of digital computers, such as laptops, desktops, workstations, personal digital assistants, servers, blade servers, mainframes, and other appropriate computers.

The computing device 1000 can include a power source 1008, a processor 1009, a memory 1010, a storage device 1011, all connected to a bus 1050. Further, a high-speed interface 1012, a low-speed interface 1013, high-speed expansion ports 1014 and low speed connection ports 1016, can be connected to the bus 1050. In addition, a low-speed expansion port 1015 is in connection with the bus 1050. Contemplated are various component configurations that may be mounted on a common motherboard depending upon the specific application. Further still, an input interface 1017 can be connected via bus 1050 to an external receiver 1006 and an output interface 1018. A receiver 1019 can be connected to an external transmitter 1007 and a transmitter 1020 via the bus 1050. Also connected to the bus 1050 can be an external memory 1004, external sensors 1003, machine(s) 1002 and an environment 1001. Further, one or more external input/output devices 1005 can be connected to the bus 1050. A network interface controller (NIC) 1021 can be adapted to connect through the bus 1050 to a network 1022, wherein data or other data, among other things, can be rendered on a third-party display device, third party imaging device, and/or third-party printing device outside of the computer device 1000.

Still referring to FIG. 10, contemplated is that the memory 1010 can store instructions that are executable by the computer device 1000, historical data, and any data that can be utilized by the methods and systems of the present disclosure. The memory 1010 can include random access memory (RAM), read only memory (ROM), flash memory, or any other suitable memory systems. The memory 1010 can be a volatile memory unit or units, and/or a non-volatile memory unit or units. The memory 1010 may also be another form of computer-readable medium, such as a magnetic or optical disk.

A storage device 1011 can be adapted to store supplementary data and/or software modules used by the computer device 1000. For example, the storage device 1011 can store historical data and other related data as mentioned above regarding the present disclosure. Additionally, or alternatively, the storage device 1011 can store historical data similar to data as mentioned above regarding the present disclosure. The storage device 1011 can include a hard drive, an optical drive, a thumb-drive, an array of drives, or any combinations thereof. Further, the storage device 1011 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1009), perform one or more methods, such as those described above.

Still referring to FIG. 10, the system can be linked through the bus 1050 optionally to a display interface or user Interface (HMI) 1023 adapted to connect the system to a display device 1025 and keyboard 1024, wherein the display device 1025 can include a computer monitor, camera, television, projector, or mobile device, among others. The computer device 1000 can include a user input interface 1017 adapted to a printer interface (not shown) can also be connected through bus 1050 and adapted to connect to a printing device (not shown), wherein the printing device can include a liquid inkjet printer, solid ink printer, large-scale commercial printer, thermal printer, UV printer, or dye-sublimation printer, among others.

Still referring to FIG. 10, the high-speed interface 1012 manages bandwidth-intensive operations for the computing device 1000, while the low-speed interface 1013 manages lower bandwidth-intensive operations. Such allocation of functions is an example only. In some implementations, the high-speed interface 1012 can be coupled to the memory 1010, a user interface (HMI) 1023, and to a keyboard 1024 and display 1025 (e.g., through a graphics processor or accelerator), and to the high-speed expansion ports 1014, which may accept various expansion cards (not shown) via bus 1050. In the implementation, the low-speed interface 1013 is coupled to the storage device 1011 and the low-speed expansion port 1015, via bus 1050. The low-speed expansion port 1015, which may include various communication ports (e.g., USB, Bluetooth, Ethernet, wireless Ethernet) may be coupled to one or more input/output devices 1005, and other devices a keyboard 1024, a pointing device (not shown), a scanner (not shown), or a networking device such as a switch or router, e.g., through a network adapter.

The computing device 1000 may be implemented in a number of different forms, as shown in the figure. For example, it may be implemented as a standard server 1026, or multiple times in a group of such servers. In addition, it may be implemented in a personal computer such as a laptop computer 1027. It may also be implemented as part of a rack server system 1028. Alternatively, components from the computing device 1000 may be combined with other components in a mobile device (not shown). Each of such devices may contain one or more of the computing device and the mobile computing device, and an entire system may be made up of multiple computing devices communicating with each other.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A drift-based rendezvous control system for controlling an operation of a chaser spacecraft to rendezvous the chaser spacecraft to a goal region over a finite time horizon, comprising:
    a transceiver configured to accept data including values of chaser spacecraft states at a specified time period within the finite time horizon;
    a processor at the specified time period configured to:
        access a memory having stored data including a goal region database;
        select a set of drift regions corresponding to a desired goal region at a location on an orbit where a target is located at the specified time period, wherein the set of drift regions represents regions of state space around the desired goal region that guarantee thruster free operation to reach the desired goal region, wherein each of the regions of state space comprise a position and a velocity of the chaser spacecraft;
        update a controller having a model of dynamics of the chaser spacecraft with the accepted data;
        formulate the set of drift regions as a penalty in a cost function of the updated controller;
        generate control commands that result in a real-time drift-based control policy where upon entering the drift regions, the thrusters are turned off in order to minimize an amount of operation of the thrusters while rendezvousing with the desired goal region; and
        output the control commands to activate or not activate one or more thrusters of the chaser spacecraft for the specified time period based on the control commands.

2. The drift-based rendezvous control system of claim 1, wherein the chaser spacecraft states and target states of the target further comprise one or combination of orientations, and translational and angular velocities of the chaser spacecraft and the target, and perturbations acting on a system of multiple celestial objects including the chaser spacecraft and the target.

3. The drift-based rendezvous control system of claim 2, wherein the perturbations are natural orbital forces including one or more of solar gravitational perturbations, lunar gravitational perturbations, anisotropic gravitational perturbations, solar radiation pressure, and air drag.

4. The drift-based rendezvous control system of claim 3, wherein the celestial objects include a primary body around which the target orbits, and a secondary body, so that the target is in a halo orbit.

5. The drift-based rendezvous control system of claim 1, wherein the processor is a guidance and control computer (GCC) in communication with the transceiver and the memory, such that a target orbit is determined from the accepted data, the data includes uploaded ephemeris from a ground station, ground data obtained in satellite tracking databases, or estimated from onboard sensor measurements on the chaser spacecraft.

6. The drift-based rendezvous control system of claim 1, wherein the target is one of a spacecraft, a space station, a celestial body or orbital debris, and wherein a region around the target is one of an approach ellipsoid (AE) region, a keep-out sphere (KOS) region, an approach polytope (AP) region or a keep-out polytope (KOP) region.

7. The drift-based rendezvous control system of claim 1, wherein a target orbit is one of circular orbits, elliptic orbits, halo orbits, near rectilinear halo orbits or a quasi-satellite orbit.

8. A drift-based rendezvous control system for controlling an operation of a spacecraft to rendezvous the spacecraft with a target over a finite time horizon, comprising:
a transceiver configured to accept data including values of spacecraft states and target states of the target in a multi-object celestial system at a specified time period within the finite time horizon;
a processor at the specified time period configured to:
access a memory having stored a target region database and a goal region database, where a goal region is outside a target region;
select a set of avoidance regions corresponding to a desired target region at a location on an orbit where the target is located at the specified time period, wherein the set of avoidance regions represents regions of space around the desired target region guaranteeing intersection trajectories with the desired target region, in an event of total or partial spacecraft thruster failure;
select a set of drift regions corresponding to a desired goal region in proximity to a location on an orbit where the target is located at the specified time period, wherein the set of drift regions represents regions of state space around the desired goal region that guarantee spacecraft thruster free operation to reach the desired goal region, wherein each of the regions of state space around the desired goal region comprise a position and a velocity of the spacecraft;
formulate the set of avoidance regions as constraints;
update a controller having a model of dynamics of the spacecraft with the accepted data;
formulate the set of drift regions as a penalty in a cost function of the updated controller;
generate control commands by subjecting the updated controller to the constraints to generate control commands that result in a real-time drift-based control policy producing a collision free rendezvous trajectory which avoids the set of avoidance regions, guaranteeing an intersection-free trajectory with respect to the desired target region in the event of the total or partial spacecraft thruster failure and upon the spacecraft entering the set of drift regions the thrusters are turned off in order to minimize an amount of operation of the thrusters while rendezvousing with the target; and
output the control commands to activate or not activate one or more thrusters of the spacecraft for the specified time period based on the control commands.

9. The drift-based rendezvous control system of claim 8, wherein the spacecraft states and target states in the multi-object celestial system further comprise one or combination of orientations, and translational and angular velocities of the spacecraft and the target, and perturbations acting on the multi-object celestial system, wherein the spacecraft and the target form the multi-object celestial system, wherein the perturbations acting on the multi-object celestial system are natural orbital forces including one or more of solar gravitational perturbations, lunar gravitational perturbations, anisotropic gravitational perturbations, solar radiation pressure, and air drag.

10. The drift-based rendezvous control system of claim 8, wherein the multi-object celestial system includes a celestial reference system or celestial coordinate system, that includes positions of the spacecraft, the target and celestial objects, in a three-dimensional space, or a plot of a direction on a celestial sphere, if an object's distance is unknown, wherein the celestial objects include a primary body around which the target orbits and a secondary body, so that the target is in a halo orbit.

11. The drift-based rendezvous control system of claim 8, wherein the processor is a guidance and control computer (GCC) in communication with the transceiver and the memory, such that a target orbit is determined based on uploaded ephemeris from a ground station, based on ground data obtained in satellite tracking databases, or estimated from onboard sensor measurements on the spacecraft obtained from the accepted data.

12. The drift-based rendezvous control system of claim 8, wherein the target is one of a spacecraft, a space station, a celestial body or orbital debris, and wherein a region around the target is one of an approach ellipsoid (AE) region, a keep-out sphere (KOS) region, an approach polytope (AP) region or a keep-out polytope (KOP) region, and wherein a target orbit is one of circular orbits, elliptic orbits, halo orbits, near rectilinear halo orbits or a quasi-satellite orbit.

13. The drift-based rendezvous control system of claim 8, wherein the set of avoidance regions and the set of drift regions are backwards reachable sets that are one of ellipsoids, polytopes or zonotopes, such that the computations of the backwards reachable sets of the desired target region around the target are performed, and in real time based on an estimated position of the target from onboard sensor measurements on the spacecraft and stored in the memory.

14. The drift-based rendezvous control system of claim 13, wherein the desired target region is time-varying as the target moves along a target orbit such that the backwards reachable sets are computed for multiple target positions and desired target region positions along the target orbit.

15. The drift-based rendezvous control system of claim 8, wherein the controller is a model predictive controller (MPC), such that the MPC uses a local convexification of the set of avoidance regions to formulate linear passive safety constraints that are only satisfied when a spacecraft state of the spacecraft states is not inside an avoidance region.

16. The drift-based rendezvous control system of claim 15, wherein the local convexification of the set of avoidance regions is achieved by computing a half space constraint that approximates an avoidance region boundary, such that the half space constraint is formulated as a chance constraint which requires that the half space constraint be satisfied with at least a priori specified probability level due to an uncertainty regarding a position of the spacecraft or the target, and/or an uncertainty of a thruster magnitude or a direction.

17. The drift-based rendezvous control system of claim 8, wherein the updated controller is subjected to the constraints by formulating an optimal control problem that includes the constraints so that when optimized over a set of admissible control inputs, an optimizer generates the control commands.

18. The drift-based rendezvous control system of claim 8, wherein the control commands are generated for each specified time period of multiple specified time periods in the finite time horizon, or generated iteratively over a receding time-horizon.

19. A drift-based rendezvous control method for controlling an operation of a spacecraft to rendezvous the spacecraft with a target over a finite time horizon, comprising:

accepting data including values of spacecraft states and target states in a multi-object celestial system at a specified time period within the finite time horizon;

using a processor at the specified time period for:

accessing a memory having stored a target region database and a goal region database, where a goal region is outside a target region;

selecting a set of avoidance regions corresponding to a desired target region at a location on an orbit where the target is located at the specified time period, wherein the set of avoidance regions represents regions of space around the desired target region guaranteeing intersection trajectories with the desired target region, in an event of total or partial spacecraft thruster failure;

selecting a set of drift regions corresponding to a desired goal region in proximity to a location on an orbit where the target is located at the specified time period, wherein the set of drift regions represents regions of state space around the desired goal region that guarantee spacecraft thruster free operation to reach the desired goal region, wherein each of the regions of state space around the desired goal region comprise a position and a velocity of the spacecraft;

formulating the set of avoidance regions as constraints;

updating a controller having a model of dynamics of the spacecraft with the accepted data;

formulating the set of drift regions as a penalty in a cost function of the updated controller;

generating control commands by subjecting the updated controller to the constraints to generate control commands that result in a real-time drift-based control policy producing a collision free rendezvous trajectory which avoids the set of avoidance regions, guaranteeing an intersection-free trajectory with respect to the desired target region in the event of the total or partial spacecraft thruster failure and upon the spacecraft entering the set of drift regions the thrusters are turned off in order to minimize an amount of operation of the thrusters while rendezvousing with the target; and outputting the control commands to activate or not activate one or more thrusters of the spacecraft for the specified time period based on the control commands.

20. A non-transitory machine-readable medium including instructions stored thereon which, when executed by processing circuitry, configure the processing circuitry in real time to control an operation of a spacecraft to rendezvous the spacecraft with a target over a finite time horizon using a drift-based rendezvous control method, a transceiver accepts data including values of spacecraft states and target states in a multi-object celestial system at a specified time period within the finite time horizon, the drift-based rendezvous control method comprising:

using a processor at the specified time period for:

accessing a memory having stored a target region database and a goal region database, where a goal region is outside a target region;

selecting a set of avoidance regions corresponding to a desired target region at a location on an orbit where the target is located at the specified time period;

selecting a set of drift regions corresponding to a desired goal region in proximity to a location on an orbit where the target is located at the specified time period, wherein the set of drift regions represents regions of state space around the desired goal region that guarantee spacecraft thruster free operation to reach the desired goal region, wherein each of the regions of state space around the desired goal region comprise a position and a velocity of the spacecraft;

formulating the set of avoidance regions as constraints;

updating a controller having a model of dynamics of the spacecraft with the accepted data;

formulating the set of drift regions as a penalty in a cost function of the updated controller;

generating control commands by subjecting the updated controller to the constraints to generate control commands that result in a real-time drift-based control policy producing a collision free rendezvous trajectory which avoids the set of avoidance regions, guaranteeing an intersection-free trajectory with respect to the desired target region in the event of the total or partial spacecraft thruster failure and upon the spacecraft entering the set of drift regions the thrusters are turned off in order to minimize an amount of operation of the thrusters while rendezvousing with the target; and outputting the control commands to activate or not activate one or more thrusters of the spacecraft for the specified time period based on the control commands.

21. The non-transitory machine-readable medium of claim 20, wherein the set of avoidance regions represents regions of space around the desired target region guaranteeing intersection trajectories with the desired target region, in an event of total or partial spacecraft thruster failure.

* * * * *